(12) United States Patent
Faoro et al.

(10) Patent No.: US 9,886,601 B2
(45) Date of Patent: *Feb. 6, 2018

(54) SMART CARD CONNECTOR

(71) Applicant: VeriFone, Inc., San Jose, CA (US)

(72) Inventors: Davey Faoro, Newcastle, CA (US); Christian Eric Schulz, Rocklin, CA (US)

(73) Assignee: VeriFone, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/627,972

(22) Filed: Jun. 20, 2017

(65) Prior Publication Data

US 2017/0344764 A1   Nov. 30, 2017

Related U.S. Application Data

(63) Continuation of application No. 15/168,966, filed on May 31, 2016, now Pat. No. 9,715,603.

(51) Int. Cl.
*G06K 7/00* (2006.01)
*G06K 7/04* (2006.01)
*G08B 21/18* (2006.01)

(52) U.S. Cl.
CPC ........... *G06K 7/042* (2013.01); *G06K 7/0056* (2013.01); *G06K 7/0078* (2013.01); *G08B 21/18* (2013.01)

(58) Field of Classification Search
CPC .................................................. G06K 7/0056
See application file for complete search history.

(56) References Cited

U.S. PATENT DOCUMENTS

| 5,334,827 A | 8/1994 | Bleier |
| 5,929,427 A | 7/1999 | Harada |
| 5,984,184 A | 11/1999 | Kojima |

(Continued)

FOREIGN PATENT DOCUMENTS

| DE | 3916783 | 4/1990 |
| FR | 2792437 | 10/2000 |

(Continued)

OTHER PUBLICATIONS

Notice of Allowance dated Jul. 20, 2016, which issued during the prosecution of U.S. Appl. No. 14/580,995.

(Continued)

*Primary Examiner* — Christle I Marshall
(74) *Attorney, Agent, or Firm* — Hunton & Williams LLP

(57) ABSTRACT

A smart card connector including a housing defining a smart card receiving slot communicating with a smart card ingress slit formed in the housing, a plurality of smart card contacts mounted within the housing and being configured for reading contact with a smart card inserted into the slot and a movable smart card contact mounting assembly supporting at least one of the plurality of smart card contacts and for positioning the at least one of the plurality of smart card contacts in a first position, in the absence of a smart card in the slot, and in a second position, different from the first position, when a smart card is fully inserted in the slot, wherein when the at least one of the plurality of smart card contacts is in the first position it is relatively inaccessible to tampering via the smart card ingress slit.

14 Claims, 44 Drawing Sheets

(56) References Cited

U.S. PATENT DOCUMENTS

| | | |
|---|---|---|
| 6,179,638 B1 | 1/2001 | Lim |
| 6,267,295 B1 * | 7/2001 | Amagai ............... G06K 7/0021 |
| | | 235/441 |
| 6,435,887 B2 | 8/2002 | Koitsalu |
| 6,496,381 B1 | 12/2002 | Groeger |
| 6,508,673 B2 | 1/2003 | McDowell |
| 7,234,970 B2 | 6/2007 | Valcher et al. |
| 8,333,521 B2 | 12/2012 | Viglione |
| 9,038,891 B2 | 5/2015 | Lewis |
| 9,715,603 B1 * | 7/2017 | Faoro ..................... G06K 7/042 |
| 2006/0289643 A1 | 12/2006 | Hopt et al. |
| 2007/0095910 A1 | 5/2007 | Gallagher et al. |
| 2008/0121706 A1 | 5/2008 | Defibaugh et al. |
| 2008/0164320 A1 | 7/2008 | Garrido-Gadea et al. |
| 2009/0042433 A1 | 2/2009 | Bushby |
| 2009/0090778 A1 | 4/2009 | Maiterth |
| 2013/0119136 A1 | 5/2013 | Ishikawa |
| 2013/0296252 A1 | 11/2013 | Ribeiro-Pereira |
| 2013/0316556 A1 | 11/2013 | Bertsch |
| 2014/0217169 A1 | 8/2014 | Lewis |
| 2016/0267299 A1 | 9/2016 | Yanko |

FOREIGN PATENT DOCUMENTS

| | | |
|---|---|---|
| GB | 2 319 104 A | 5/1998 |
| WO | WO 2005/114544 | 12/2005 |
| WO | 2016/042543 A1 | 3/2016 |

OTHER PUBLICATIONS

U.S. Appl. No. 62/050,866, filed Sep. 16, 2014.
An International Search Report and a Written Opinion both dated Dec. 21, 2015, which issued during the prosecution of Applicant's PCT/IL2015/050851.
An Office Action dated Jul. 15, 2016, which issued during the prosecution of U.S. Appl. No. 15/098,629.
European Communication and Extended European Search Report, European Patent Application No. 17173858.6, dated Oct. 12, 2017, pp. 1-9.
European Communication and Partial European Search Report, European Patent Application No. 17173857.8, dated Oct. 11, 2017, pp. 1-9.

\* cited by examiner

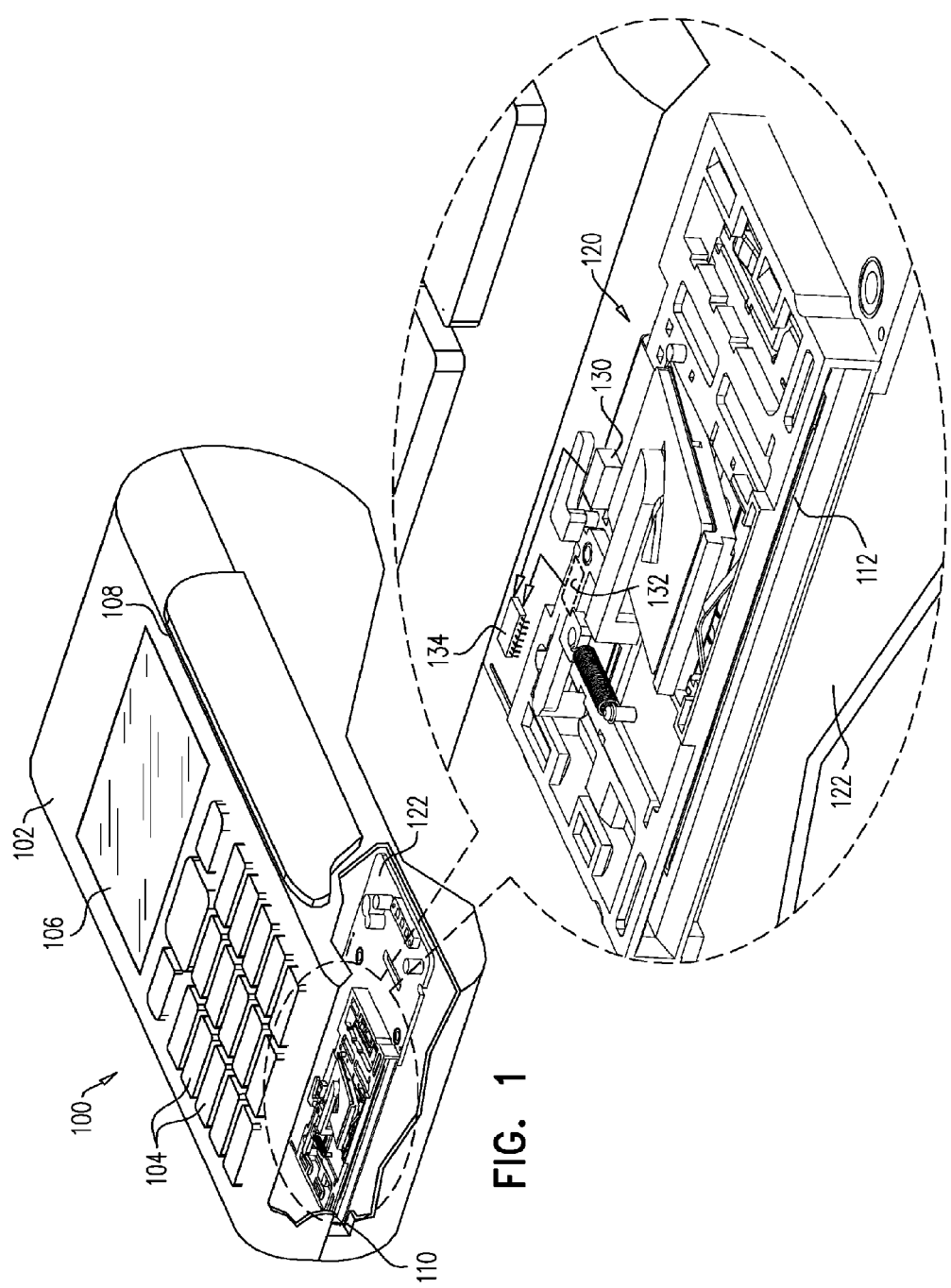

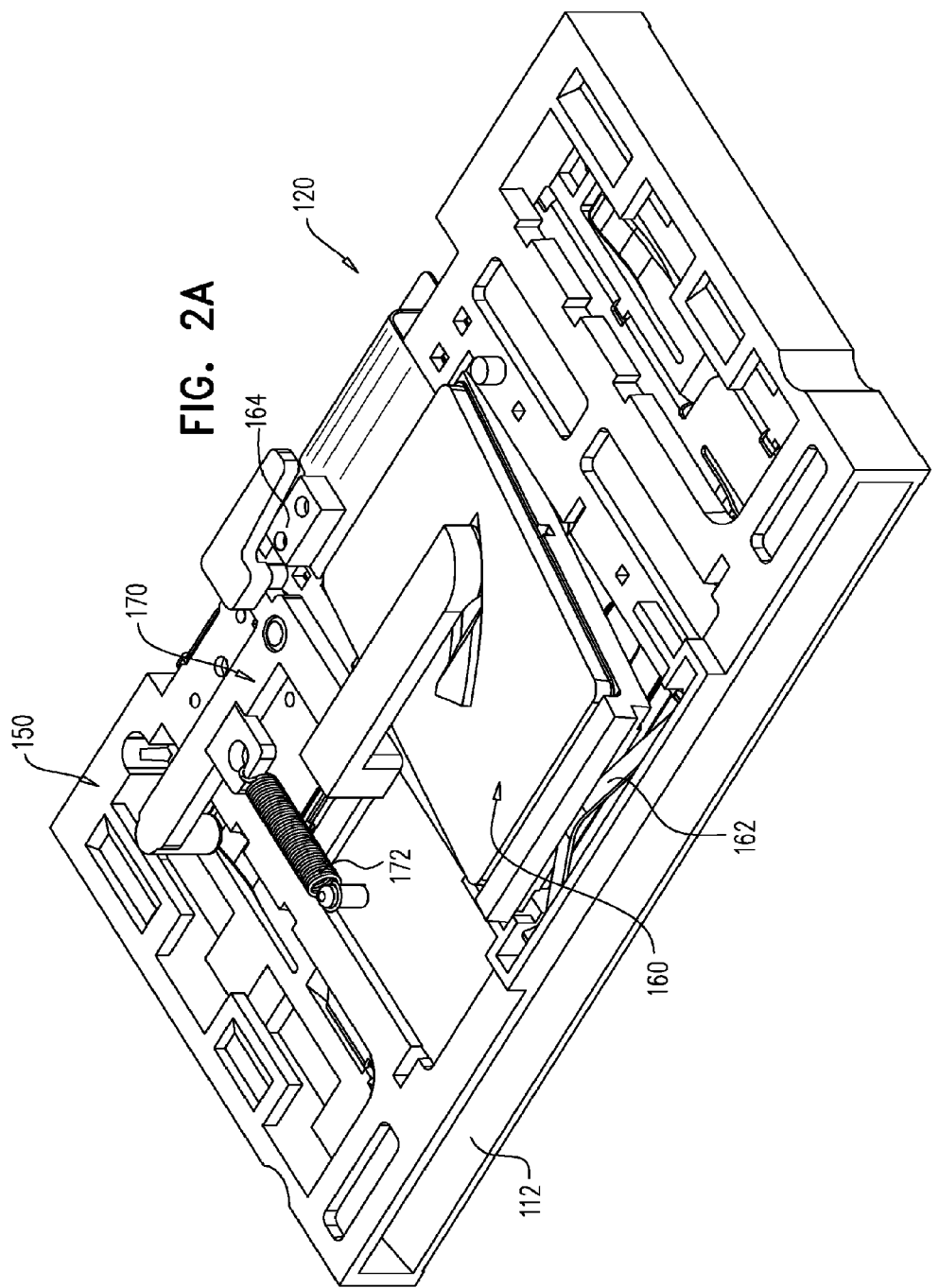

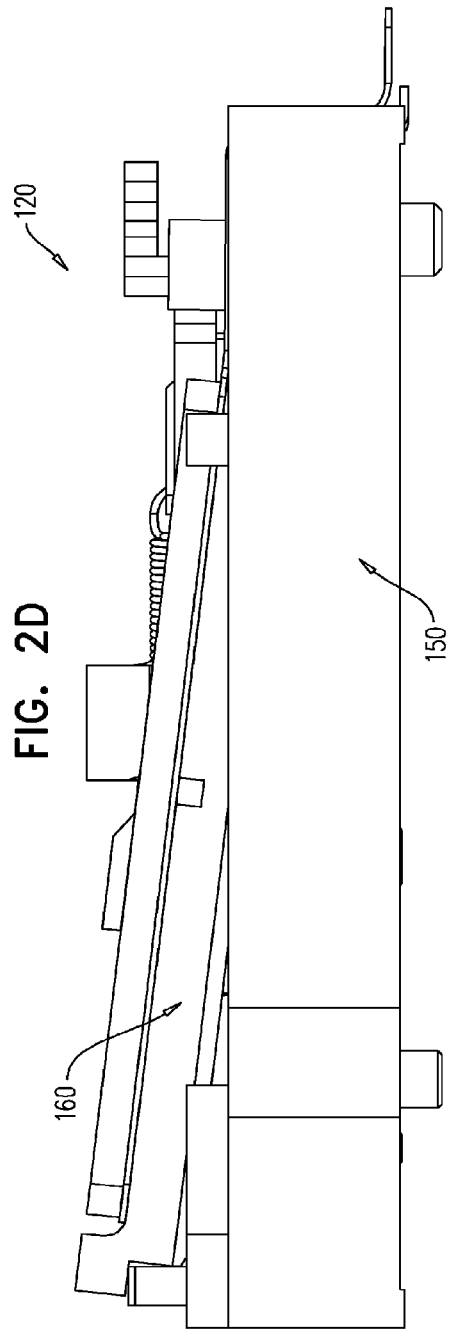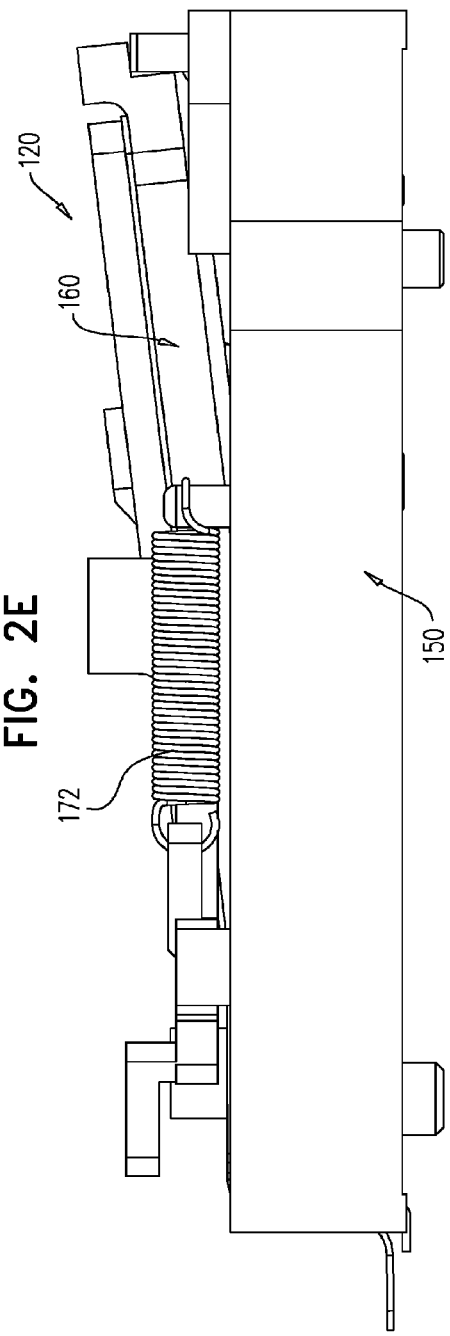

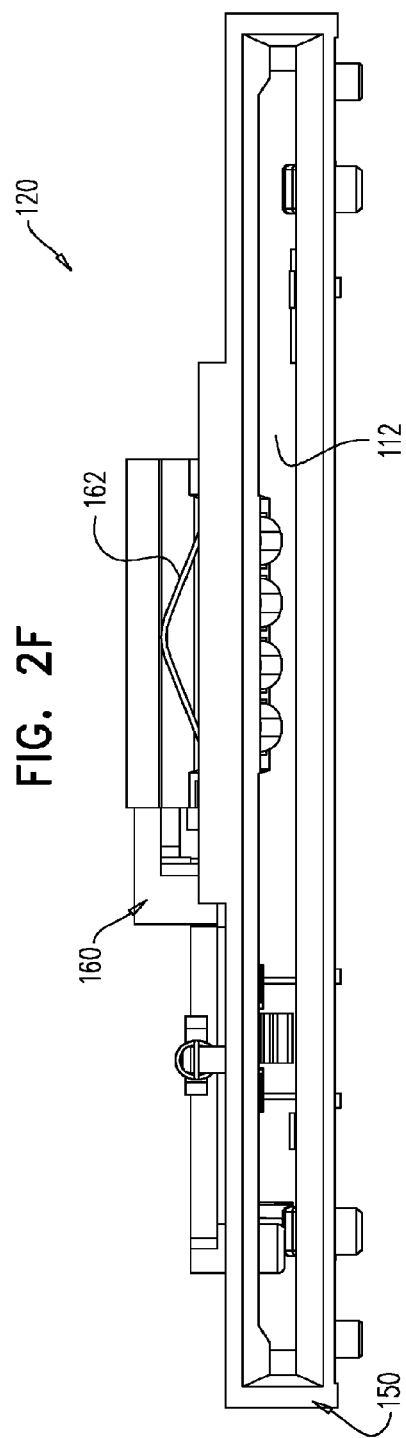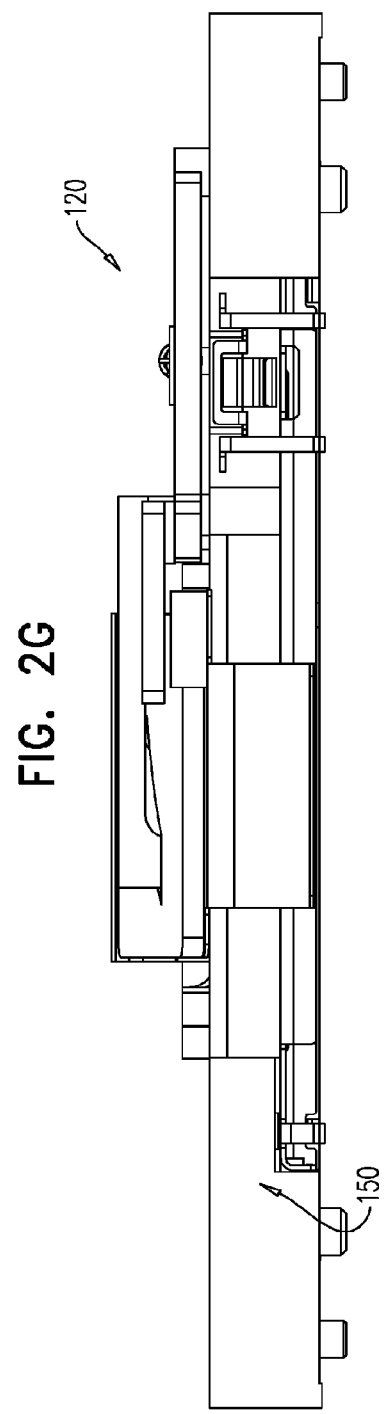

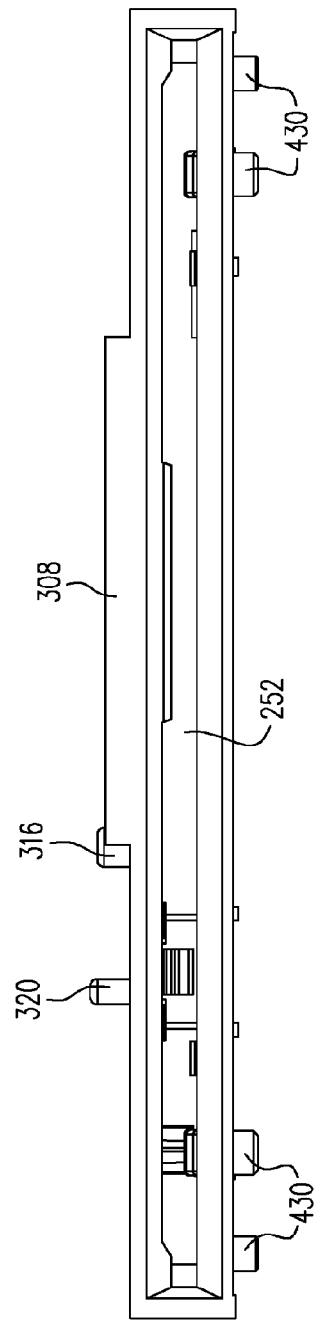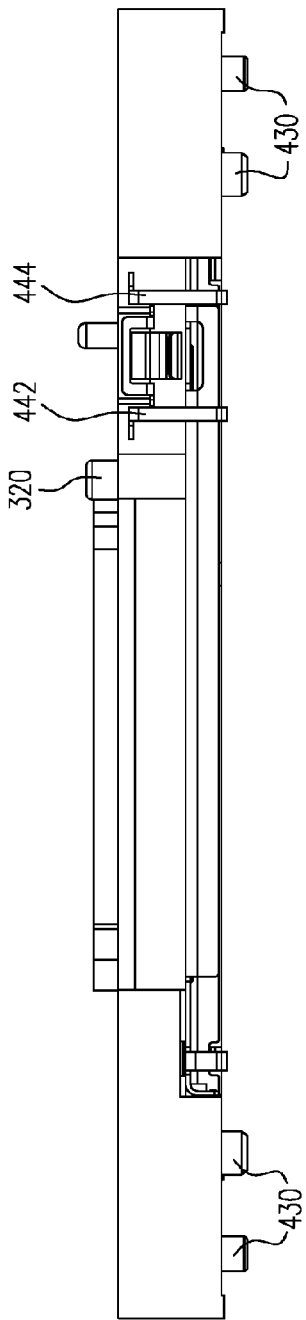

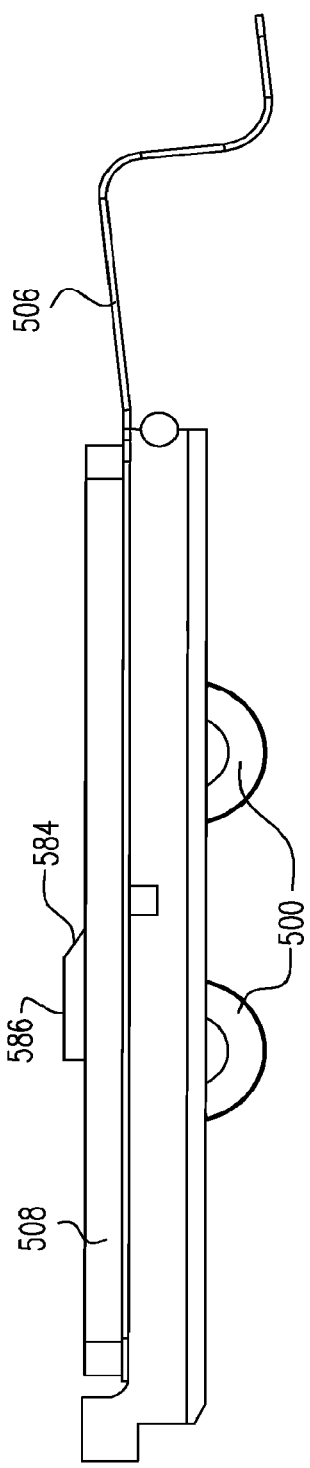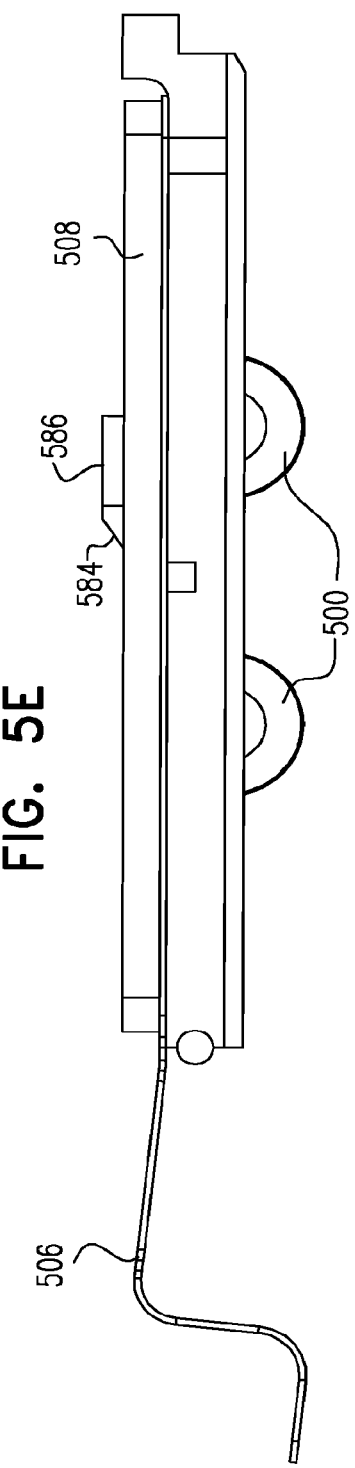

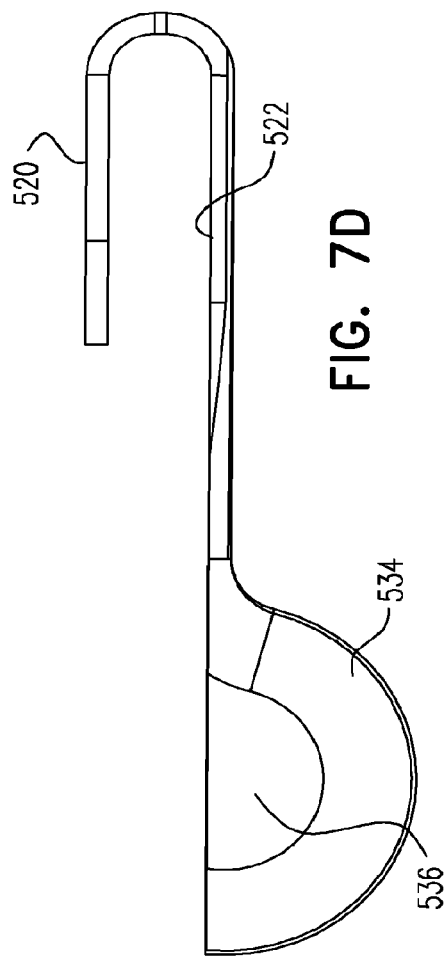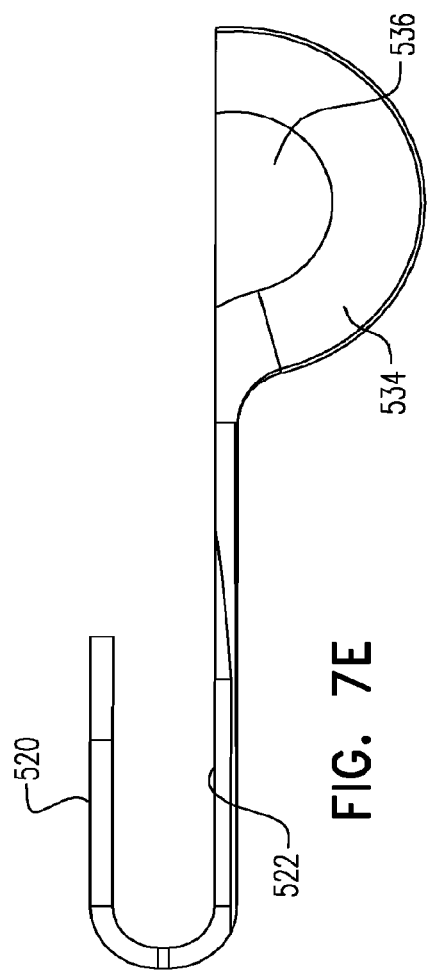

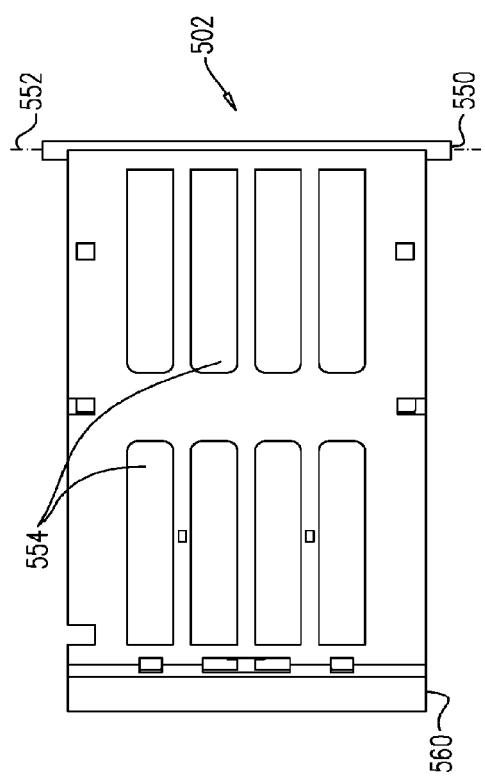
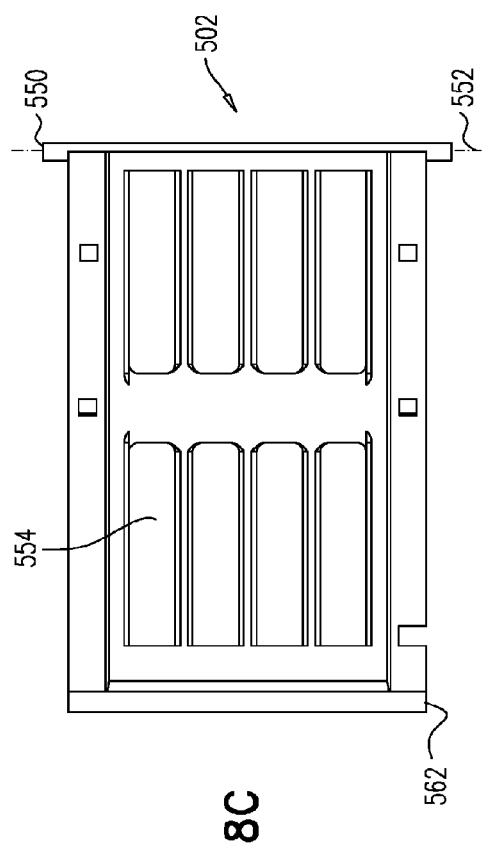
FIG. 8B
FIG. 8C

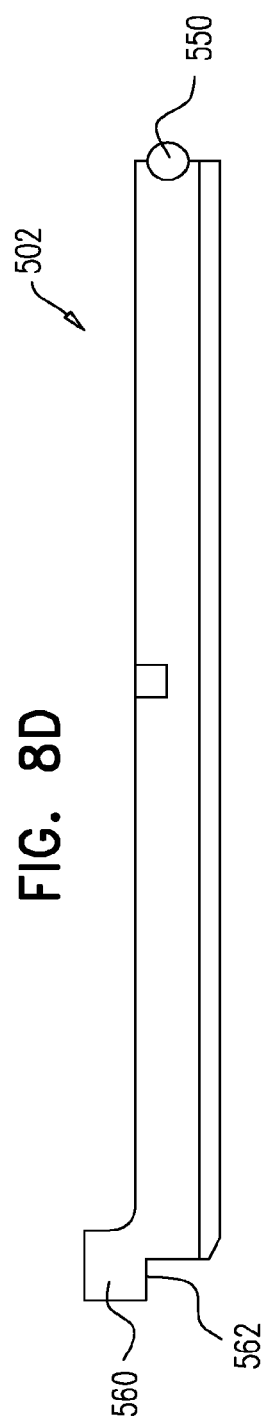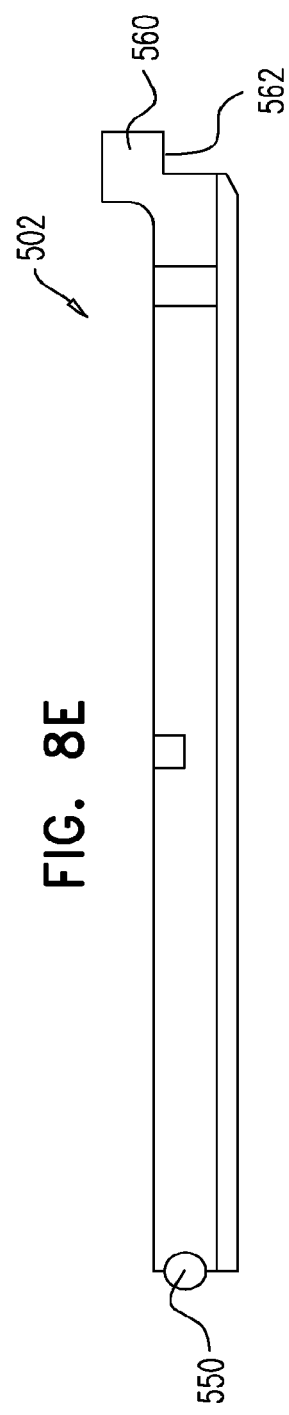

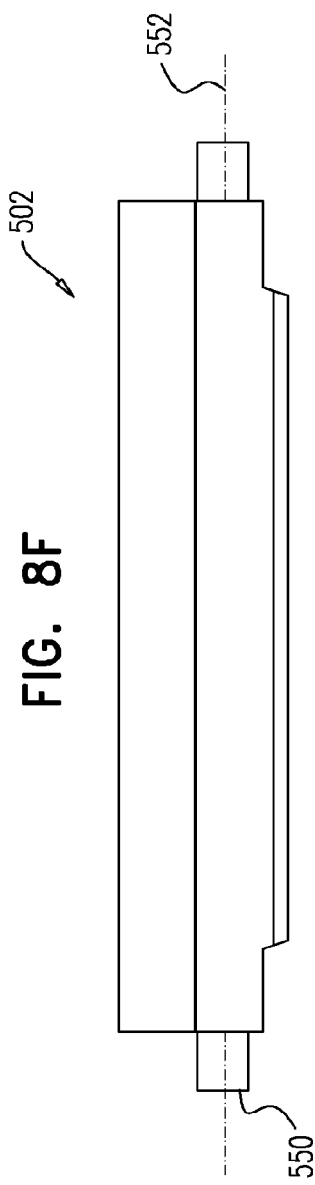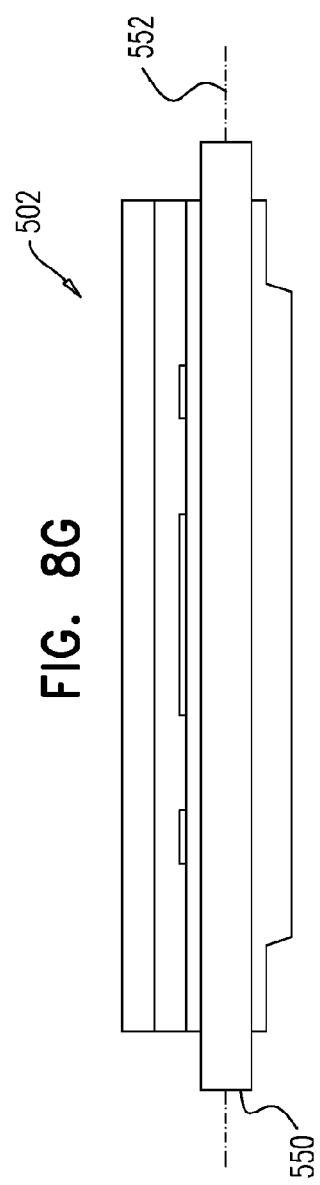

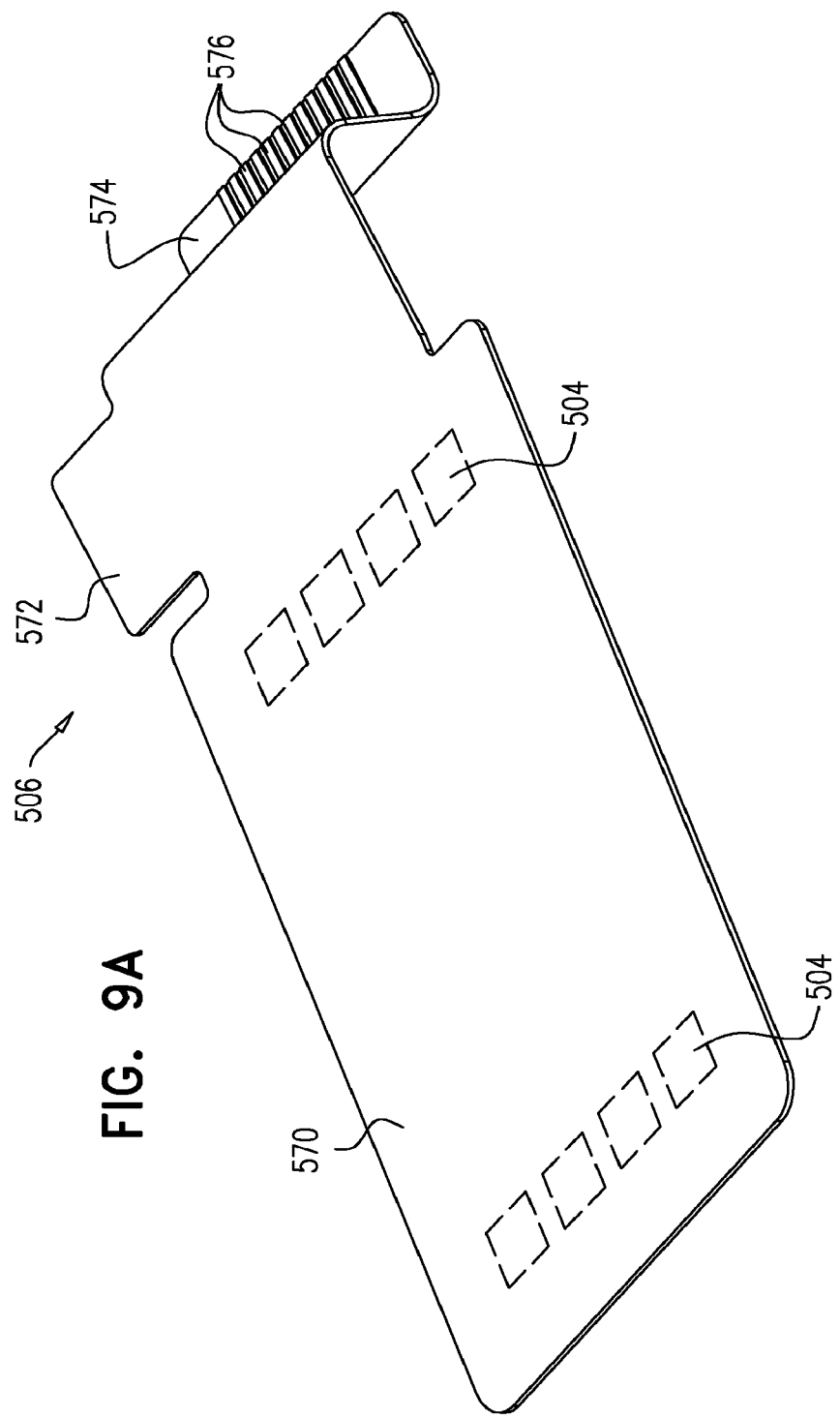

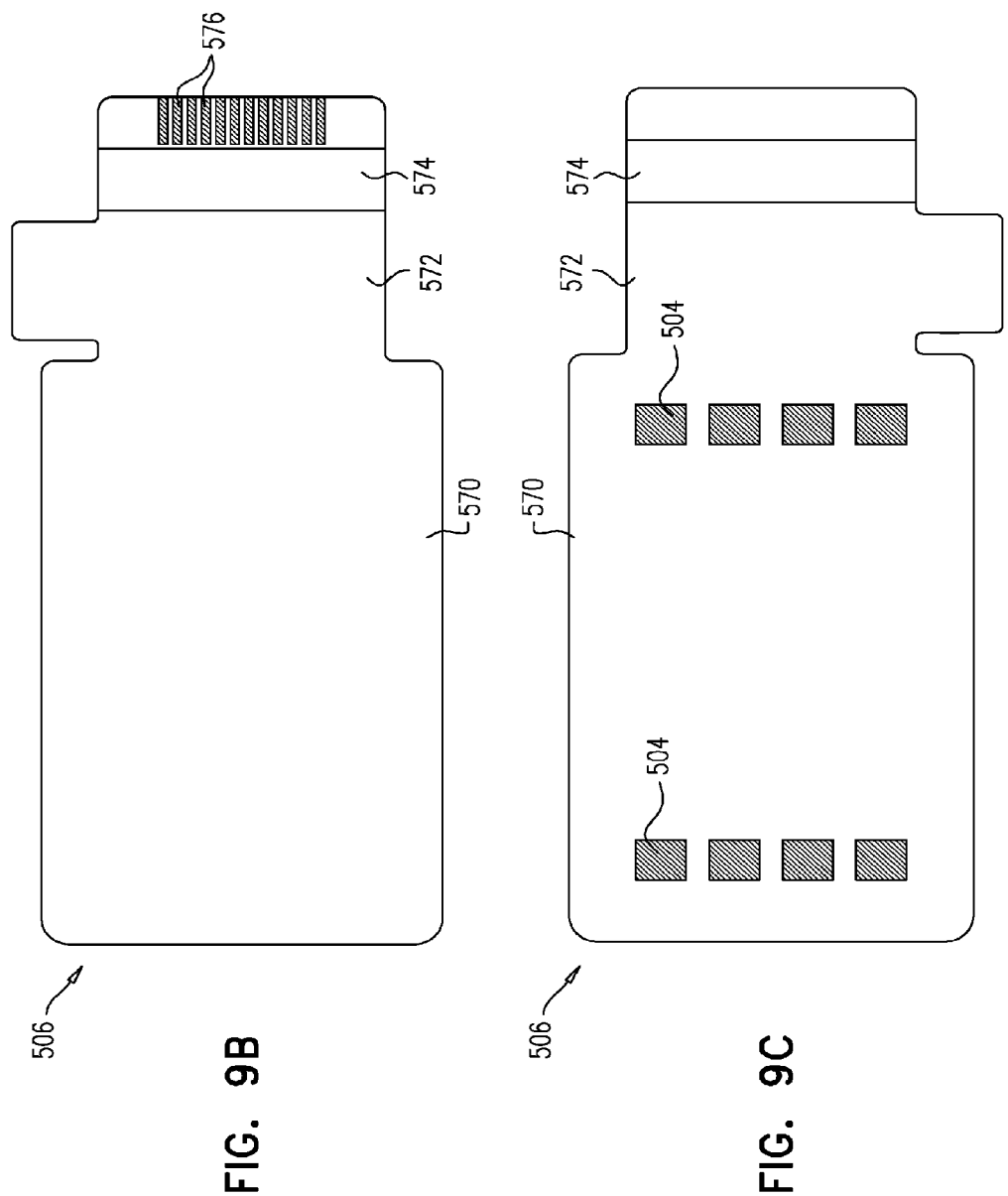

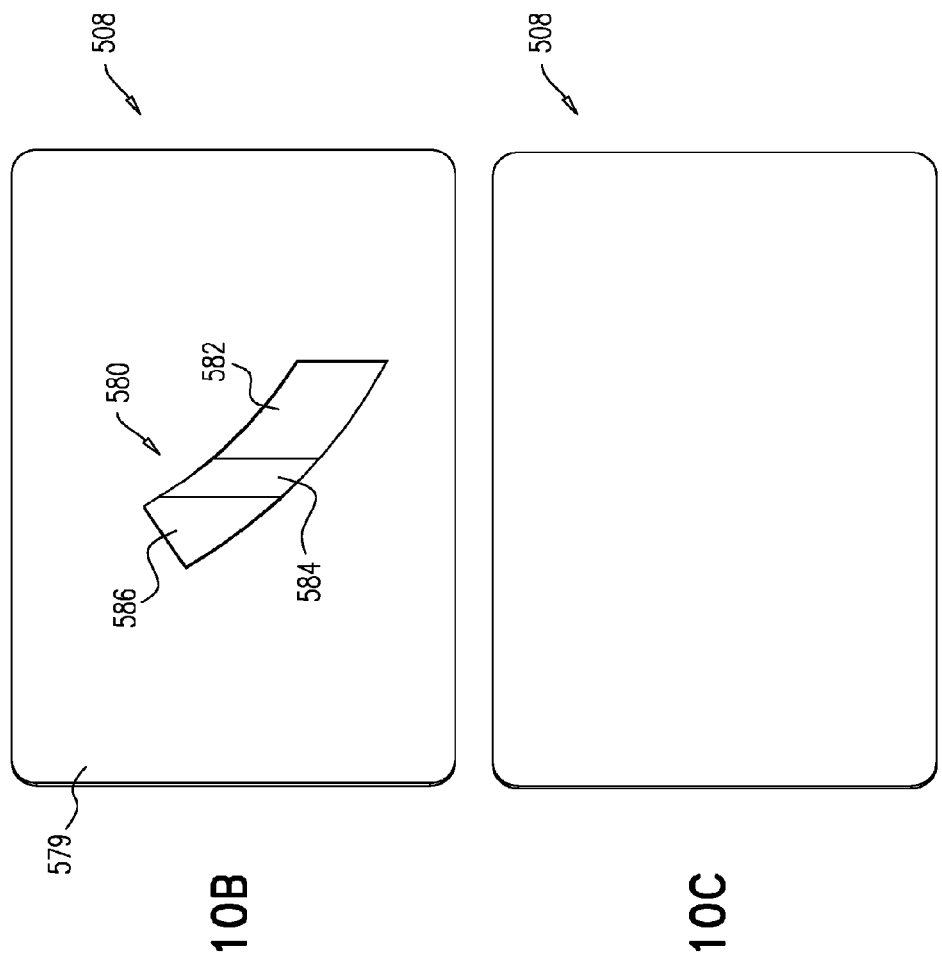

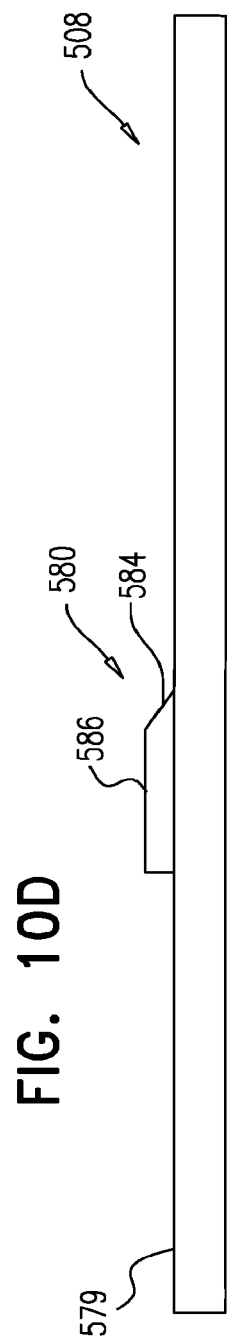
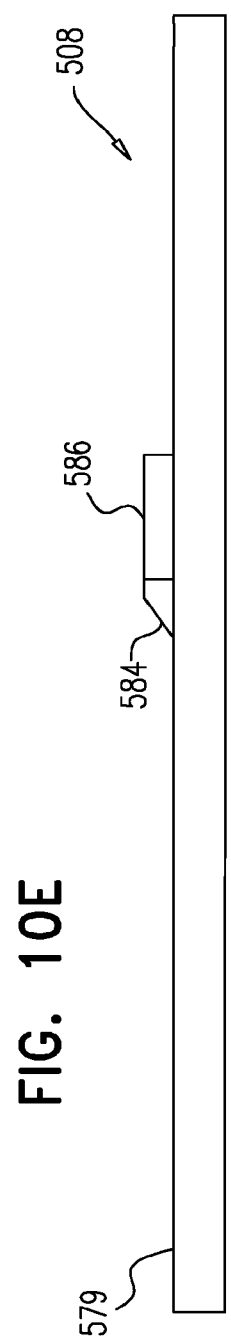

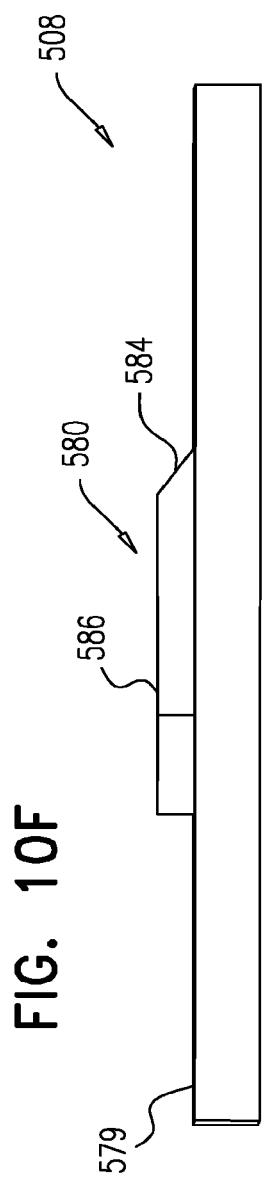
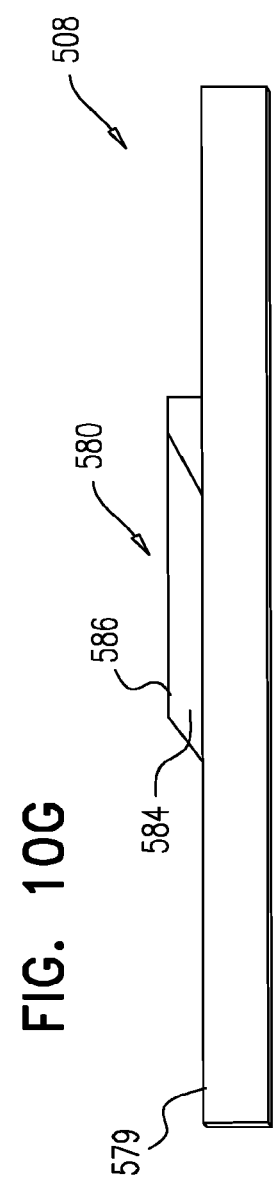

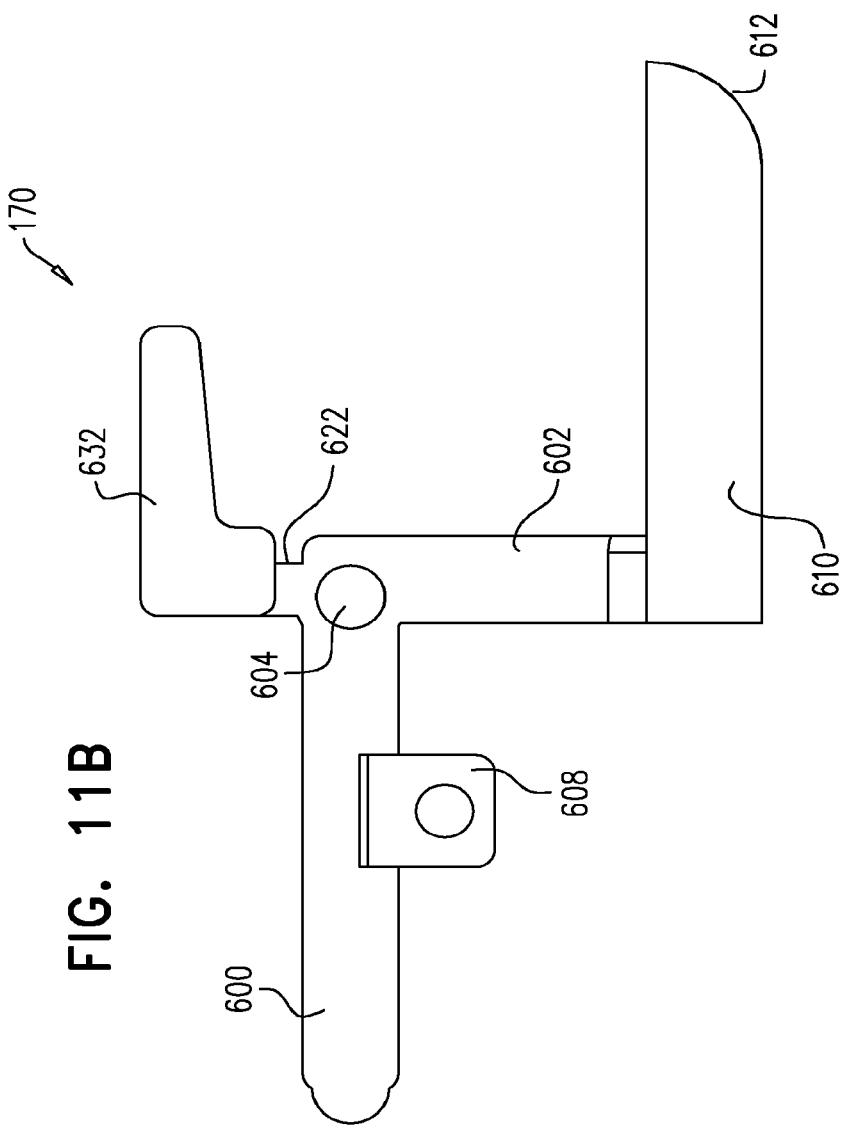

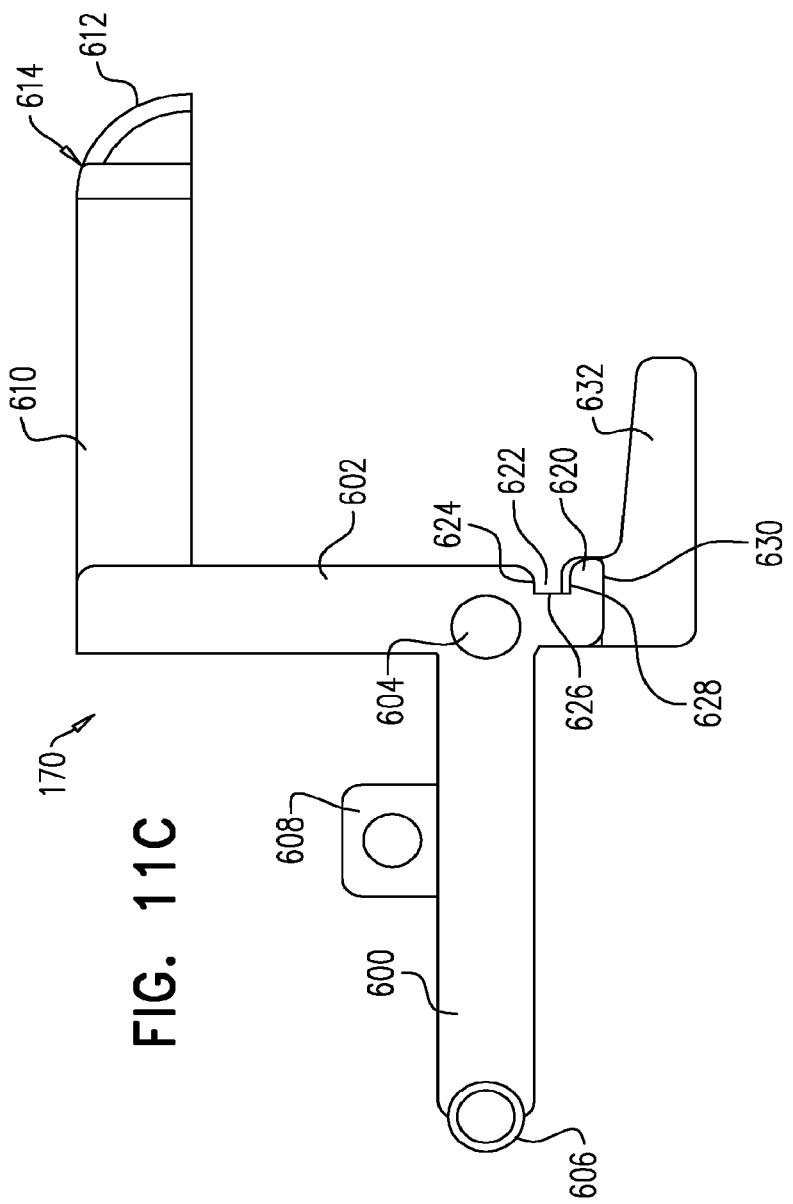

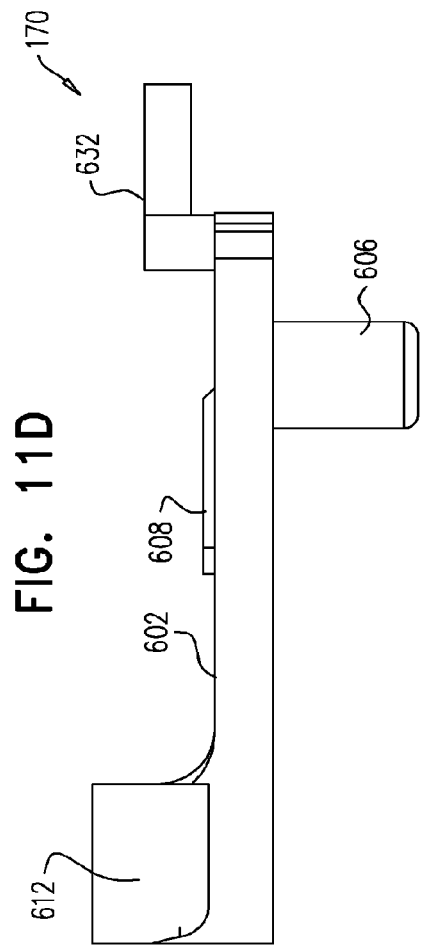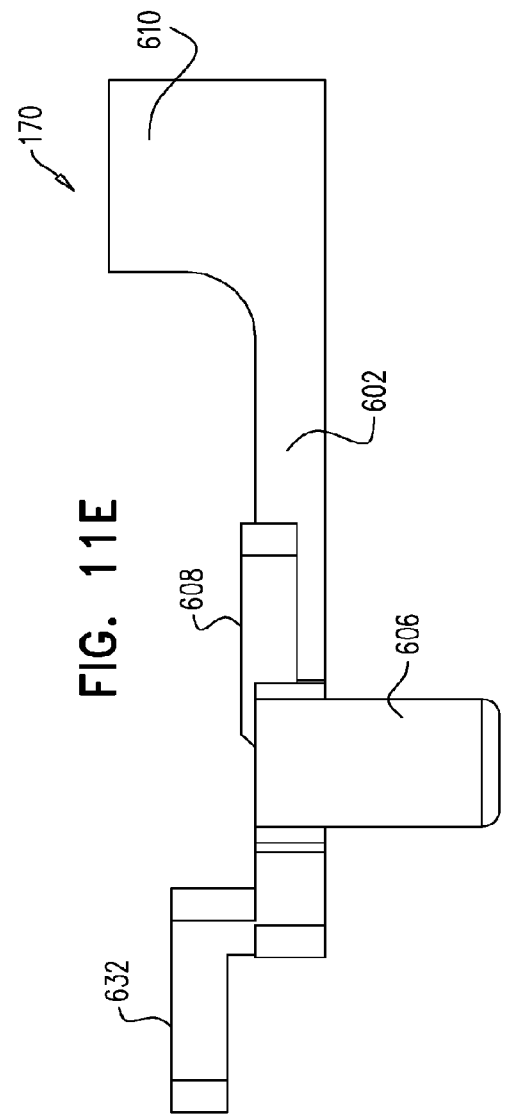

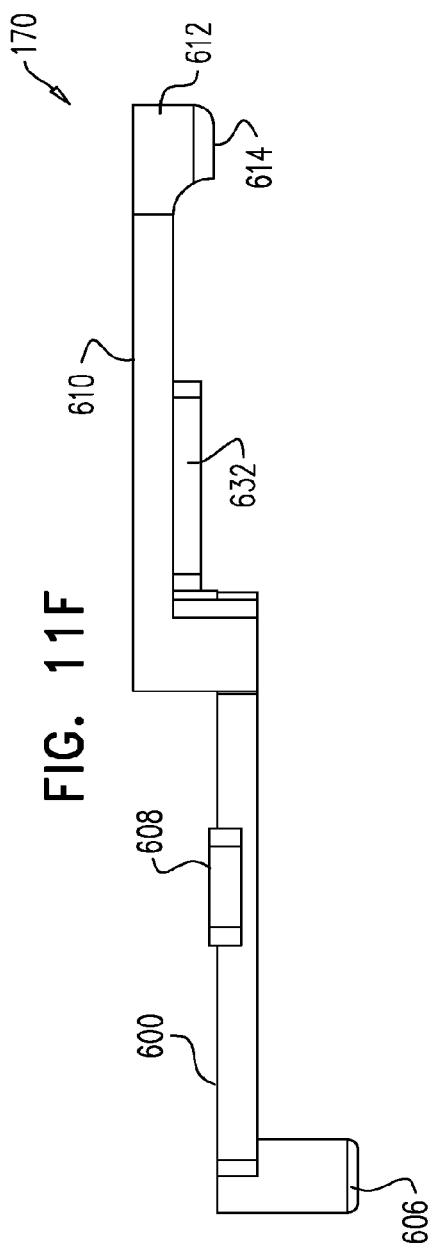
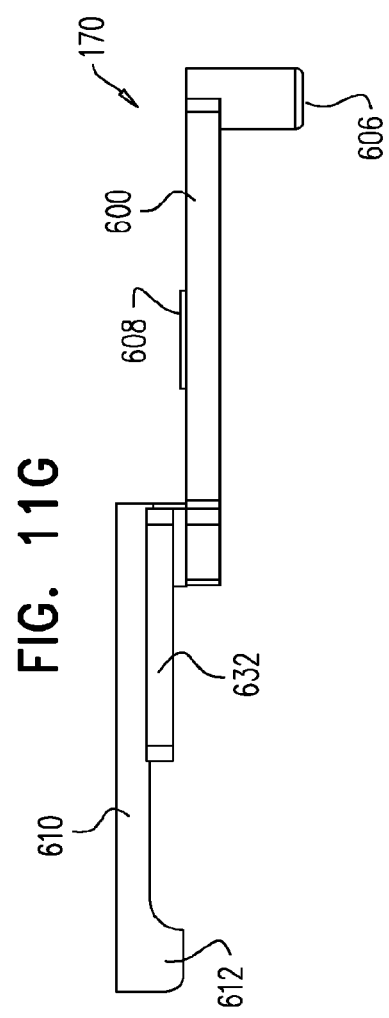

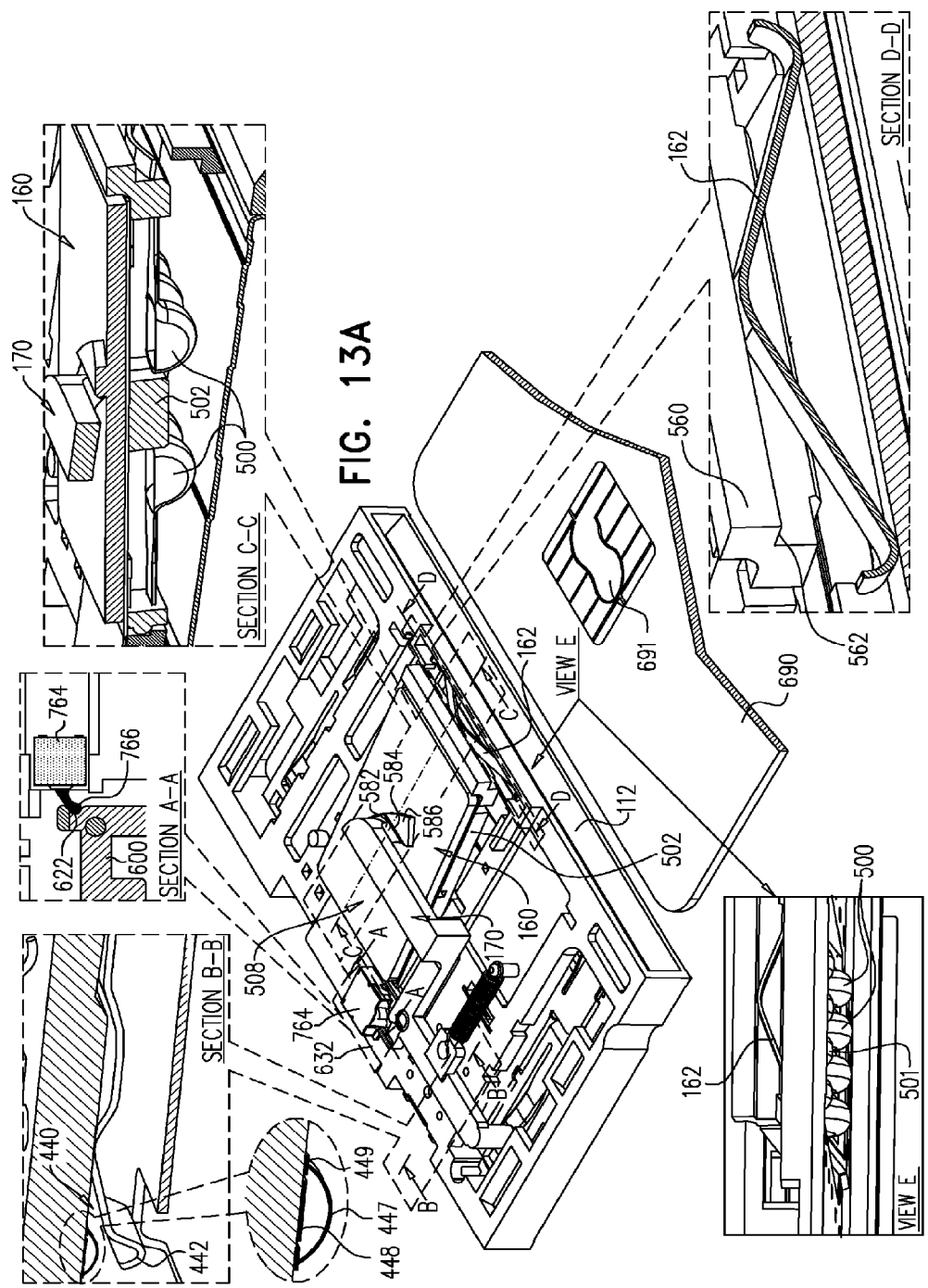

SMART CARD CONNECTOR

RELATED APPLICATIONS

This application is a continuation of U.S. patent application Ser. No. 15/168,966, filed May 31, 2016, now U.S. Pat. No. 9,715,603, the disclosure of which is hereby incorporated, by reference, in its entirety.

FIELD OF THE INVENTION

The present invention relates to data entry devices generally, particularly to point of sale terminals and more particularly to smart card connector assemblies for point of sale terminals.

BACKGROUND OF THE INVENTION

Various types of smart card connector assemblies for point of sale terminals are known.

SUMMARY OF THE INVENTION

The present invention seeks to provide improved smart card connector assemblies for point of sale terminals.

There is thus provided in accordance with a preferred embodiment of the present invention a smart card connector including a housing defining a smart card receiving slot communicating with a smart card ingress slit formed in the housing, a plurality of smart card contacts mounted within the housing and being configured for reading contact with a smart card inserted into the smart card receiving slot and a movable smart card contact mounting assembly supporting at least one of the plurality of smart card contacts and for positioning the at least one of the plurality of smart card contacts in a first position, in the absence of a smart card in the smart card receiving slot, and in a second position, different from the first position, when a smart card is fully inserted in the smart card receiving slot, wherein when the at least one of the plurality of smart card contacts is in the first position it is relatively inaccessible to tampering via the smart card ingress slit.

In accordance with a preferred embodiment of the present invention the at least one of the plurality of smart card contacts is an I/O contact. Additionally or alternatively, the at least one of the plurality of smart card contacts is configured to be without a hook engageable surface so as to be resistant to engagement therewith and pulling thereof by a tampering instrument inserted into the smart card ingress slit.

Preferably, the smart card connector also includes a smart card contact position sensor operative to sense when the at least one of the plurality of smart card contacts are in the second position. Additionally or alternatively, when the at least one of the plurality of smart card contacts is in the second position it is adapted for physical electrical engagement with contact pads on the smart card.

In accordance with a preferred embodiment of the present invention the smart card connector also includes a smart card insertion sensor operative to sense when a smart card is fully inserted into the smart card receiving slot. Additionally or alternatively, the smart card connector also includes tamper alarm circuitry operative to provide a tamper alarm indication in response to an output of the smart card contact position sensor indicating that at least one of the plurality of smart card contacts is in the second position orientation in the absence of a smart card fully inserted into the smart card receiving slot.

Preferably, the smart card connector also includes a smart card contact position sensor operative to sense when the I/O contact is in the second position. Additionally, the smart card connector also includes a smart card insertion sensor operative to sense when a smart card is fully inserted into the smart card receiving slot and tamper alarm circuitry operative to provide a tamper alarm indication in response to an output of the smart card contact position sensor indicating that the I/O contact is in the second position orientation in the absence of a smart card fully inserted into the smart card receiving slot.

There is also provided in accordance with another preferred embodiment of the present invention a smart card connector including a housing defining a smart card receiving slot communicating with a smart card ingress slit formed in the housing and a plurality of smart card contacts mounted within the housing and being configured for reading contact with a smart card inserted into the smart card receiving slot, at least one of the plurality of smart card contacts being configured without a hook engageable surface so as to be resistant to engagement therewith and pulling thereof by a tampering instrument inserted into the smart card ingress slit.

In accordance with a preferred embodiment of the present invention the at least one of the plurality of smart card contacts is an I/O contact. Additionally, the smart card connector also includes a smart card contact position sensor operative to sense when the I/O contact is in a card reading position.

Preferably, the smart card connector also includes a smart card contact position sensor operative to sense when the at least one of the plurality of smart card contacts are in a card reading position.

In accordance with a preferred embodiment of the present invention when the at least one of the plurality of smart card contacts is in a card reading position it is adapted for physical electrical engagement with contact pads on the smart card.

Preferably, the smart card connector also includes a smart card insertion sensor operative to sense when a smart card is fully inserted into the smart card receiving slot. Additionally, the smart card connector also includes tamper alarm circuitry operative to provide a tamper alarm indication in response to an output of the smart card contact position sensor indicating that at least one of the plurality of smart card contacts is in the card reading position in the absence of a smart card fully inserted into the smart card receiving slot.

Preferably, the smart card connector also includes a smart card contact position sensor operative to sense when the I/O contact is in the card reading position.

In accordance with a preferred embodiment of the present invention the smart card connector also includes a smart card insertion sensor operative to sense when a smart card is fully inserted into the smart card receiving slot and tamper alarm circuitry operative to provide a tamper alarm indication in response to an output of the smart card contact position sensor indicating that the I/O contact is in the card reading position in the absence of a smart card fully inserted into the smart card receiving slot.

There is further provided in accordance with yet another preferred embodiment of the present invention a smart card connector including a housing defining a smart card receiving slot communicating with a smart card ingress slit formed in the housing, a plurality of smart card contacts mounted within the housing and being configured for reading contact with a smart card inserted into the smart card receiving slot, at least one of the plurality of smart card contacts being movable from a relatively non-tamperable position to a relatively tamperable position, a smart card contact position sensor operative to sense when the plurality of smart card contacts are in the tamperable orientation and tamper alarm circuitry operative to provide a tamper alarm indication in response to an output of the smart card contact position sensor indicating that the plurality of smart card contacts are in the tamperable orientation in the absence of a smart card fully inserted into the smart card receiving slot.

In accordance with a preferred embodiment of the present invention the at least one of the plurality of smart card contacts is an I/O contact.

In accordance with a preferred embodiment of the present invention the at least one of the plurality of smart card contacts is configured to be without a hook engageable surface so as to be resistant to engagement therewith and pulling thereof by a tampering instrument inserted into the smart card ingress slit.

Preferably, the smart card connector also includes a smart card contact position sensor operative to sense when the at least one of the plurality of smart card contacts are in the tamperable orientation. Additionally or alternatively, when the at least one of the plurality of smart card contacts is in the tamperable orientation it is adapted for physical electrical engagement with contact pads on the smart card.

In accordance with a preferred embodiment of the present invention the smart card connector also includes a smart card insertion sensor operative to sense when a smart card is fully inserted into the smart card receiving slot.

BRIEF DESCRIPTION OF THE DRAWINGS

The present invention will be understood and appreciated more fully from the following detailed description, taken in conjunction with the drawings in which:

FIG. 1 is a simplified pictorial illustration of a point of sale terminal constructed and operative in accordance with a preferred embodiment of the present invention;

FIGS. 2A, 2B, 2C, 2D, 2E, 2F and 2G are simplified drawings including, respectively, a perspective view, a top planar view, a bottom planar view, a first side planar view, a second side planar view, a front planar view and a back planar view of a smart card connector assembly constructed and operative in accordance with a preferred embodiment of the invention, which forms part of the point of sale terminal of FIG. 1 and includes an optical sensor;

FIGS. 4A, 4B, 4C, 4D, 4E, 4F, 4G and 4H are simplified drawings including, respectively, a perspective view, a top planar view, a bottom planar view, an upwardly-facing interior sectional view, taken along lines IVD-IVD in FIG. 4A, a first side planar view, a second side planar view, a front planar view and a back planar view of a base element forming part of the smart card connector of FIGS. 2A-3B;

FIGS. 5A, 5B, 5C, 5D, 5E, 5F and 5G are simplified drawings including, respectively, a perspective view, a top planar view, a bottom planar view, a first side planar view, a second side planar view, a front planar view and a back planar view of a contact block assembly forming part of the smart card connector of FIGS. 2A-3B;

FIGS. 7A, 7B, 7C, 7D, 7E, 7F and 7G are simplified drawings including, respectively, a perspective view, a top planar view, a bottom planar view, a first side planar view, a second side planar view, a front planar view and a back planar view of an electrical contact element forming part of the contact block assembly of FIGS. 5A-6B;

FIGS. 8A, 8B, 8C, 8D, 8E, 8F and 8G are simplified drawings including, respectively, a perspective view, a top planar view, a bottom planar view, a first side planar view, a second side planar view, a front planar view and a back planar view of an electrical contact element support forming part of the contact block assembly of FIGS. 5A 6B;

FIGS. 9A, 9B and 9C are simplified drawings including, respectively, a perspective view, a top planar view and a bottom planar view of a flexible printed circuit element forming part of the contact block assembly of FIGS. 5A-6B;

FIGS. 10A, 10B, 10C, 10D, 10E, 10F and 10G are, respectively, a perspective view, a top planar view, a bottom planar view, a first side planar view, a second side planar view, a front planar view and a back planar view of a cam path defining element forming part of the contact block assembly of FIGS. 5A-6B;

FIGS. 11A, 11B, 11C, 11D, 11E, 11F and 11G are simplified drawings including, respectively, a perspective view, a top planar view, a bottom planar view, a first side planar view, a second side planar view, a front planar view and a back planar view of an actuation arm forming part of the smart card connector of FIGS. 2A-3B;

FIGS. 13A and 13B are simplified perspective view illustrations illustrating a transition of an alternative embodiment of the smart card connector of FIGS. 1-11G from a card not inserted state to a card fully inserted state.

DETAILED DESCRIPTION OF PREFERRED EMBODIMENTS

Figure 2B:
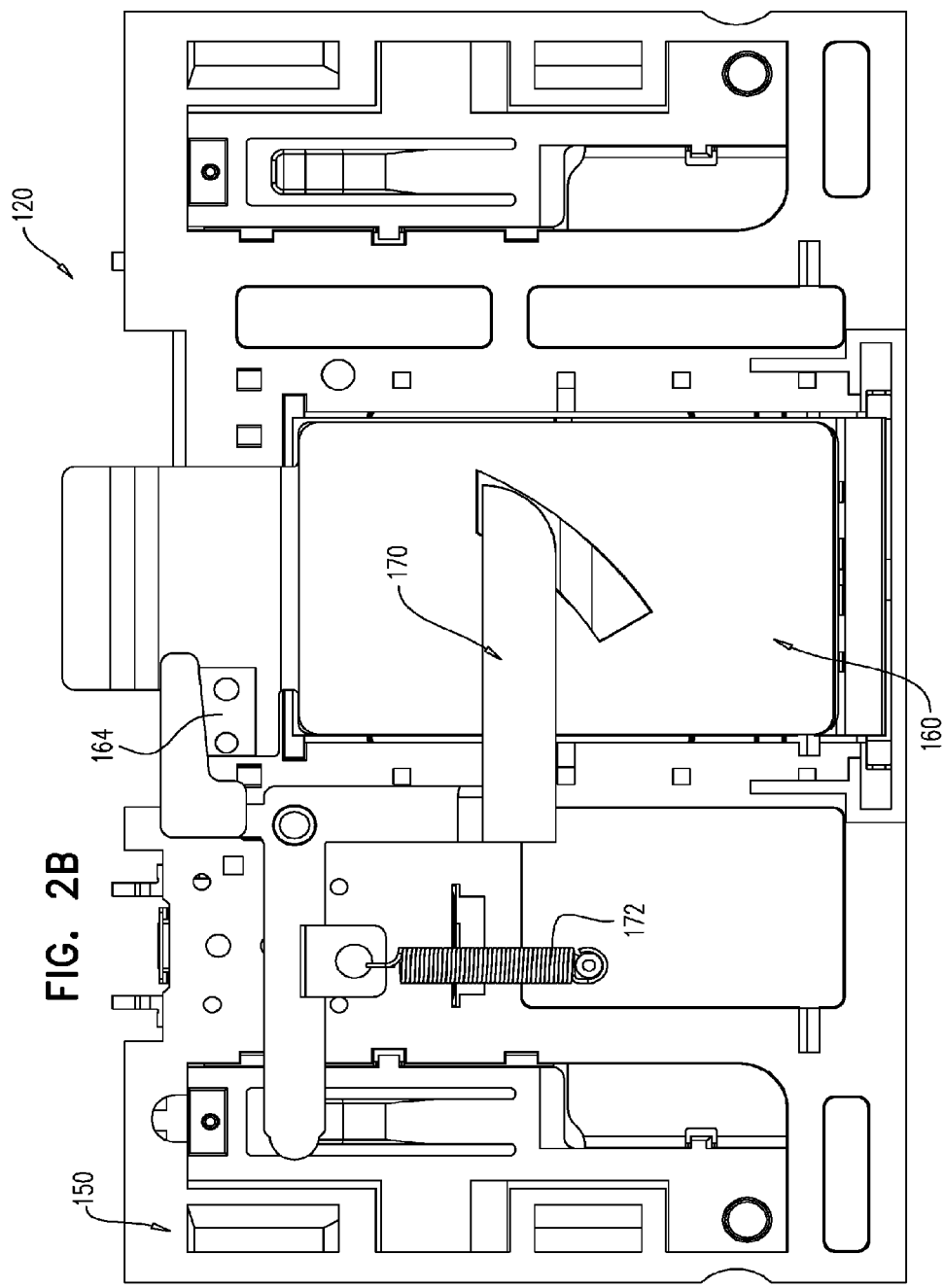
Figure 2C:
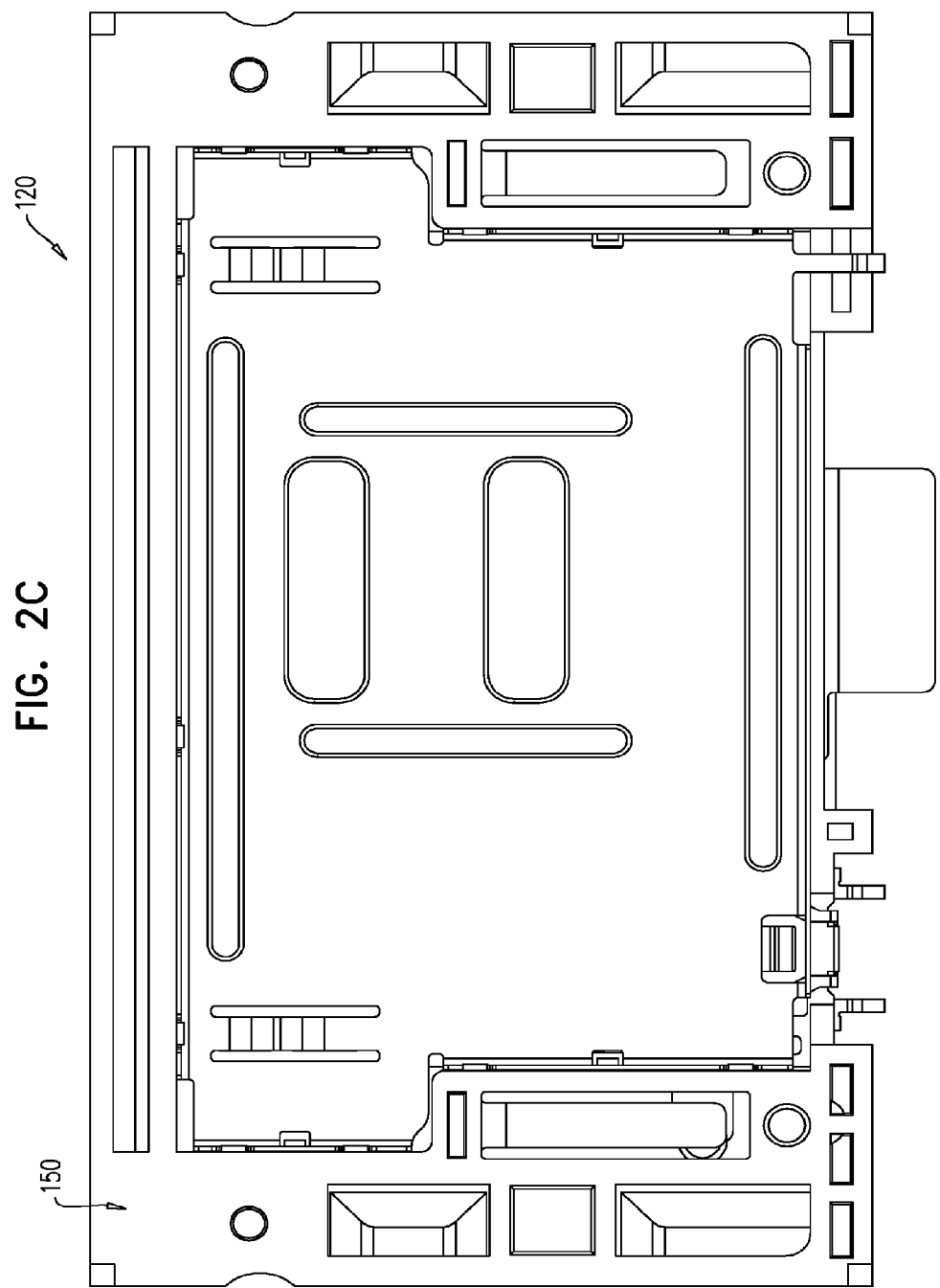

Reference is now made to FIG. 1, which is a simplified pictorial illustration of a point of sale terminal constructed and operative in accordance with a preferred embodiment of the present invention. As seen in FIG. 1, there is provided a point of sale device 100, which includes a housing 102, a keypad 104 and a display 106. Preferably, the housing 102 defines a magnetic stripe card reading slot 108 and a smart card ingress slit 110 which communicates with a smart card receiving slot 112.

Disposed within housing 102 is a secure smart card connector assembly 120, which is preferably mounted on a printed circuit board 122. It is a particular feature of the present invention that secure smart card connector assembly 120 includes an anti-tampering mechanism which minimizes exposure of smart card reading contacts to physical tampering and preferably also provides a warning of attempted tampering with the smart card reading contacts. Preferably, this anti-tampering mechanism includes a smart card contact position sensor 130, such as an optical sensor or a mechanical sensor, which is operative to sense when the smart card contacts are in a tamperable orientation. Smart card contact position sensor 130 may be, for example, mechanical or optical.

The anti-tampering mechanism also includes a card full insertion sensor 132 (shown in dashed lines in FIG. 1), which is operative to sense when a card is not fully inserted into smart card receiving slot 112.

The anti-tampering mechanism also includes a tamper alarm circuit 134, operative to provide a tamper alarm indication in response to outputs of the smart card contact position sensor 130 and of the card full insertion sensor 132, indicating that the plurality of smart card contacts are in the tamperable orientation in the absence of a smart card fully inserted into said smart card receiving slot 112. Tamper alarm circuit 134 may be embodied in a microprocessor which forms part of a point of sale device and governs the operation thereof.

Figure 3A:
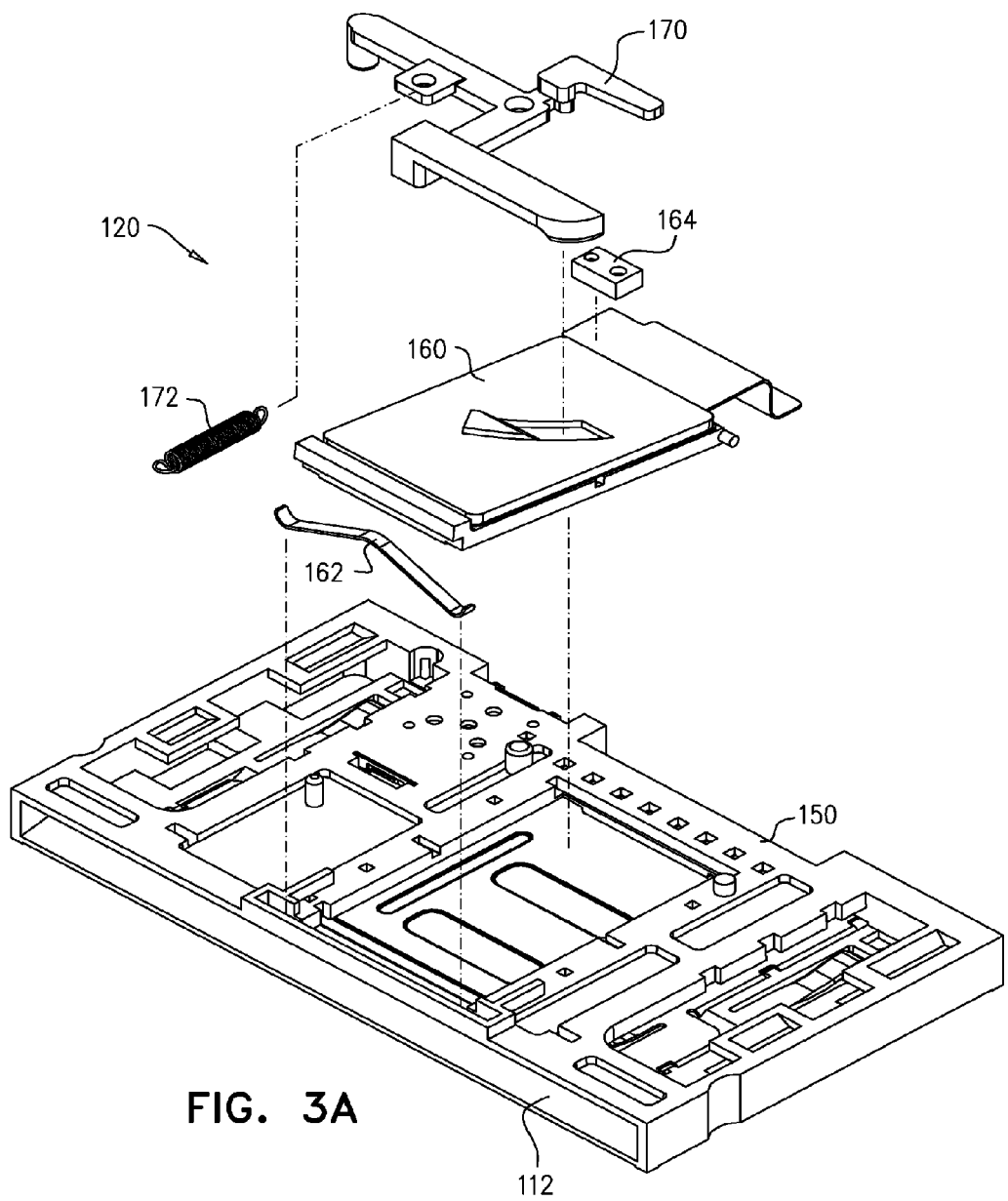
FIGS. 3A and 3B are simplified exploded view illustrations, taken generally in mutually opposite directions, of the smart card connector assembly of FIGS. 2A-2G.
Figure 3B:
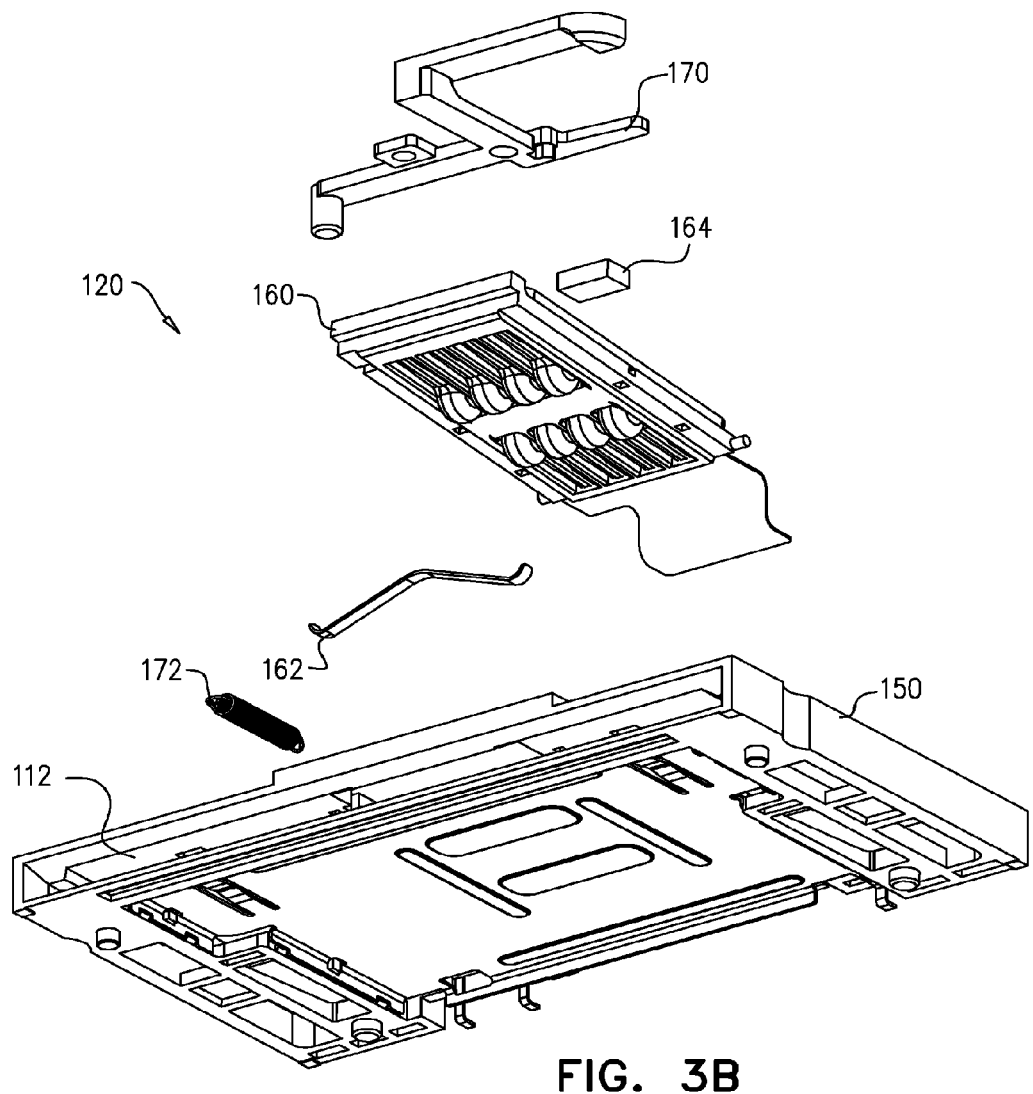

Reference is now additionally made to FIGS. 2A, 2B, 2C, 2D, 2E, 2F and 2G, which are simplified drawings including, respectively, a perspective view, a top planar view, a bottom planar view, a first side planar view, a second side planar view, a front planar view and a back planar view of the smart card connector assembly 120, which forms part of the point of sale terminal of FIG. 1, and to FIGS. 3A and 3B, which are simplified exploded view illustrations, taken generally in mutually opposite directions, of the smart card connector assembly 120 of FIGS. 2A-2G.

As seen in FIGS. 2A-3B, the smart card connector assembly 120 includes a base element 150, a contact block assembly 160, which is pivotably mounted onto base element 150 and biased by a leaf spring 162, a contact block assembly position sensor 164, which is an embodiment of contact position sensor 130 (FIG. 1A), and which senses the position of the contact block assembly 160 relative to base element 150, and an actuation arm 170, biased by a tension coil spring 172, which governs the position of the contact block assembly 160 relative to base element 150 in response to the presence of a smart card in smart card receiving slot 112. Contact block assembly position sensor 164 senses the rotational position of actuation arm 170, which in turn governs the pivotal orientation of the contact block assembly 160, and is typically an optical sensor 164 as shown. Alternatively, contact position sensor 130 may be a mechanical sensor or any other suitable type of sensor.

Figure 4A:
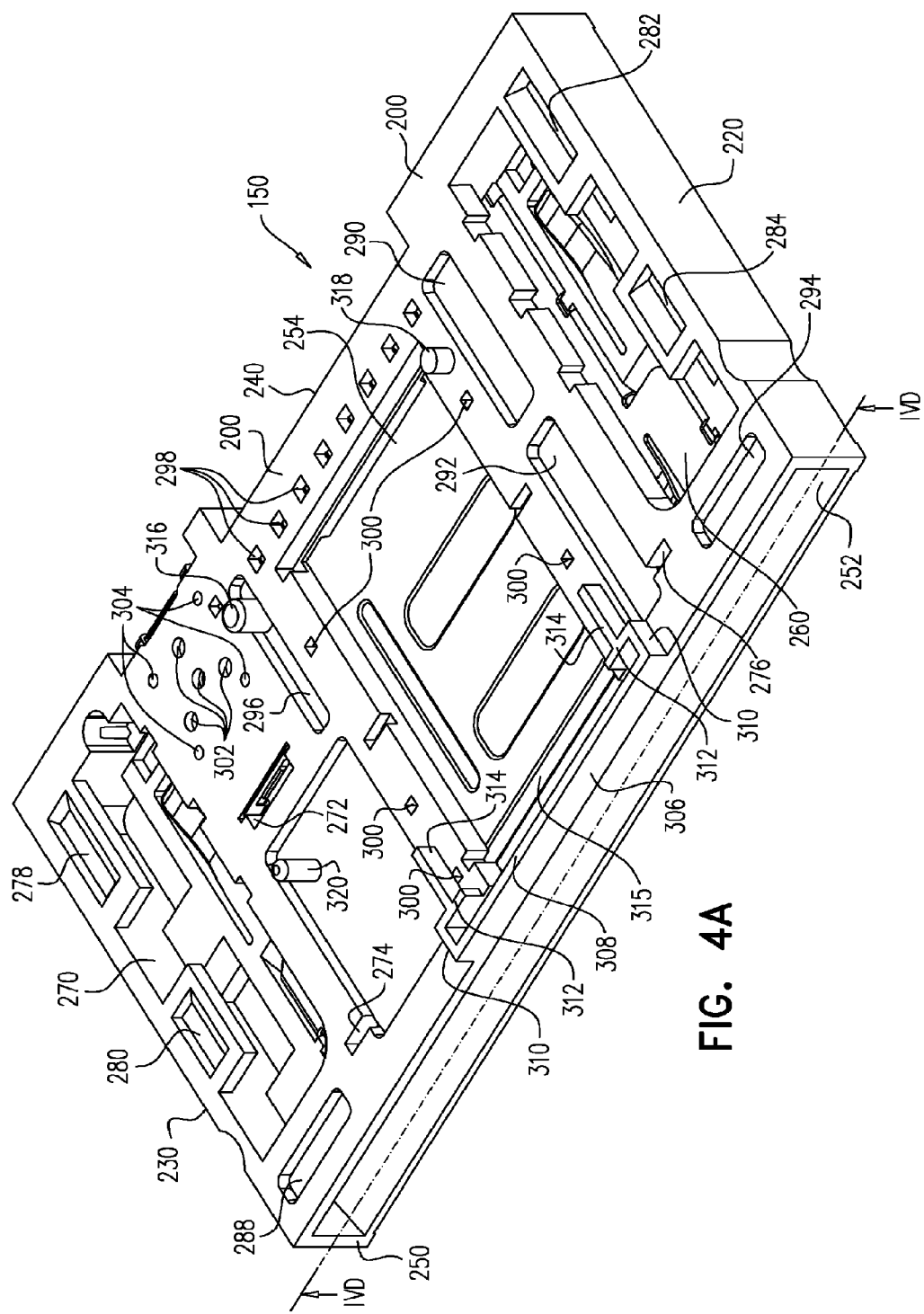

Reference is now additionally made to FIGS. 4A, 4B, 4C, 4D, 4E, 4F, 4G and 4H, which are simplified drawings including, respectively, a perspective view, a top planar view, a bottom planar view, an upwardly-facing interior sectional view, taken along lines IVD-IVD in FIG. 4A, a first side planar view, a second side planar view, a front planar view and a back planar view of base element 150, forming part of the smart card connector assembly 120 of FIGS. 2A-3B.

As seen in FIGS. 4A-4H, base element 150 is a generally rectangular element having a top wall portion 200, a bottom wall portion 210, first and second side wall portions 220 and 230, a rear wall portion 240 and a front wall portion 250, which defines a smart card access slit 252 which lies behind and is aligned with smart card ingress slit 110 (FIG. 1) and leads to smart card receiving slot 112, which is defined by interior surfaces of top wall portion 200, bottom wall portion 210, first and second side wall portions 220 and 230 and rear wall portion 240.

Figure 4B:
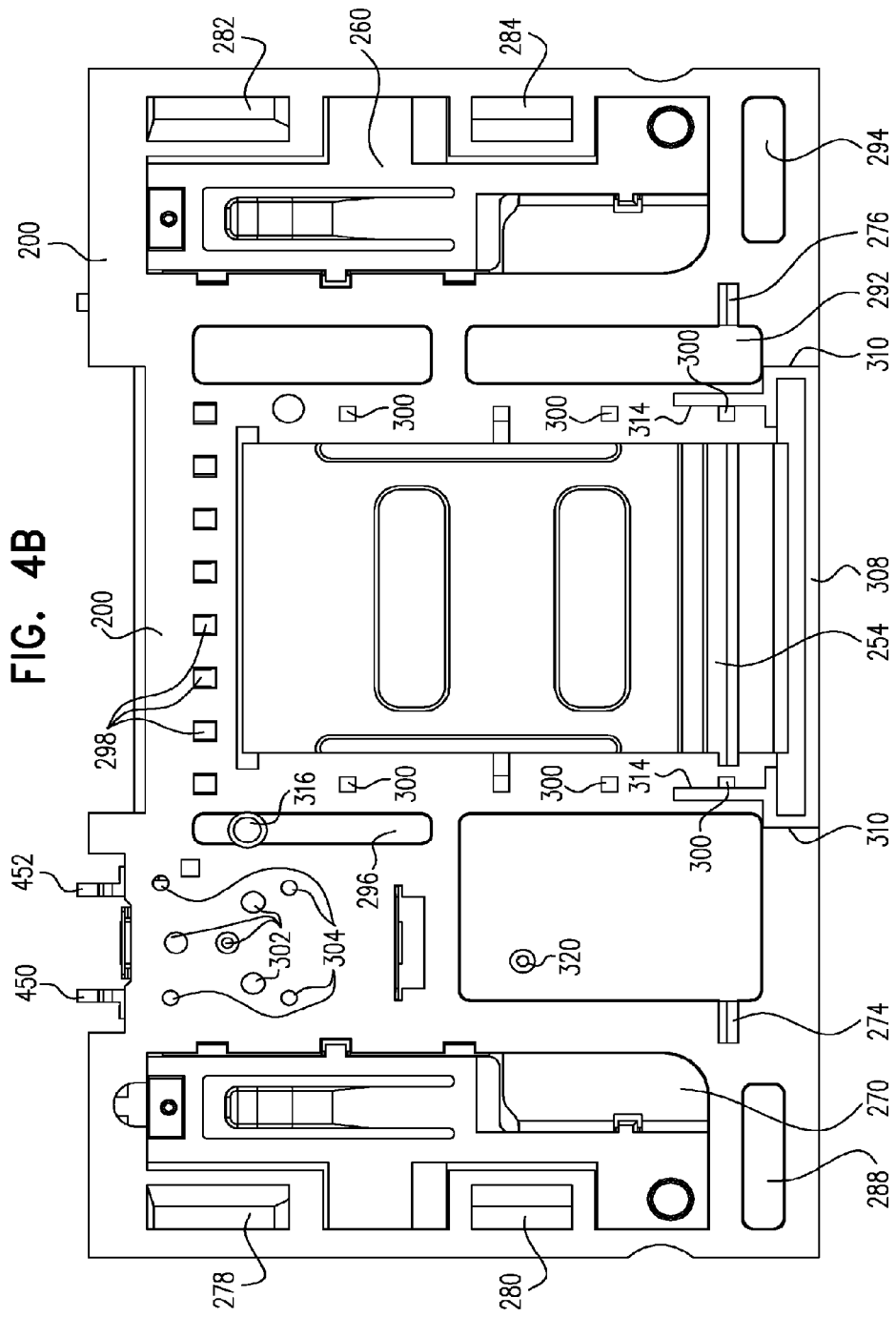

As seen particularly in FIGS. 4A and 4B, top wall portion 200 includes a central aperture 254, a first side aperture 260 and a second side aperture 270. Top wall portion 200 also includes a relatively long slit aperture 272 and a pair of relatively short slit apertures 274 and 276. Additionally, top wall portion 200 includes first, second, third and fourth upwardly facing tapered elongate recesses, respectively designated by reference numerals 278, 280, 282 and 284. Further, top wall portion 200 includes first, second, third, fourth and fifth upwardly facing elongate recesses having rounded corners, respectively designated by reference numerals 288, 290, 292, 294 and 296.

It is also seen that top wall portion 200 additionally includes a plurality of relatively large square recesses 298, arranged in a row, a plurality of relatively small square recesses 300, a plurality of relatively large circular recesses 302 and a plurality of relatively small circular recesses 304. It is further seen that an upstanding wall portion 306 is provided and includes a central portion 308, a pair of side portions 310 extending perpendicularly to central portion 308, a pair of intermediate portions 312 extending mutually inwardly from respective side portions 310, parallel to central portion 308, and a pair of end portions 314 extending from intermediate portions 312 perpendicularly to central portion 308. Upstanding wall portion 306 defines a socket 315, which accommodates leaf spring 162.

It is additionally seen that there are provided three generally circular cylindrical upwardly facing protrusions, respectively designated by reference numerals 316, 318 and 320.

Figure 4C:
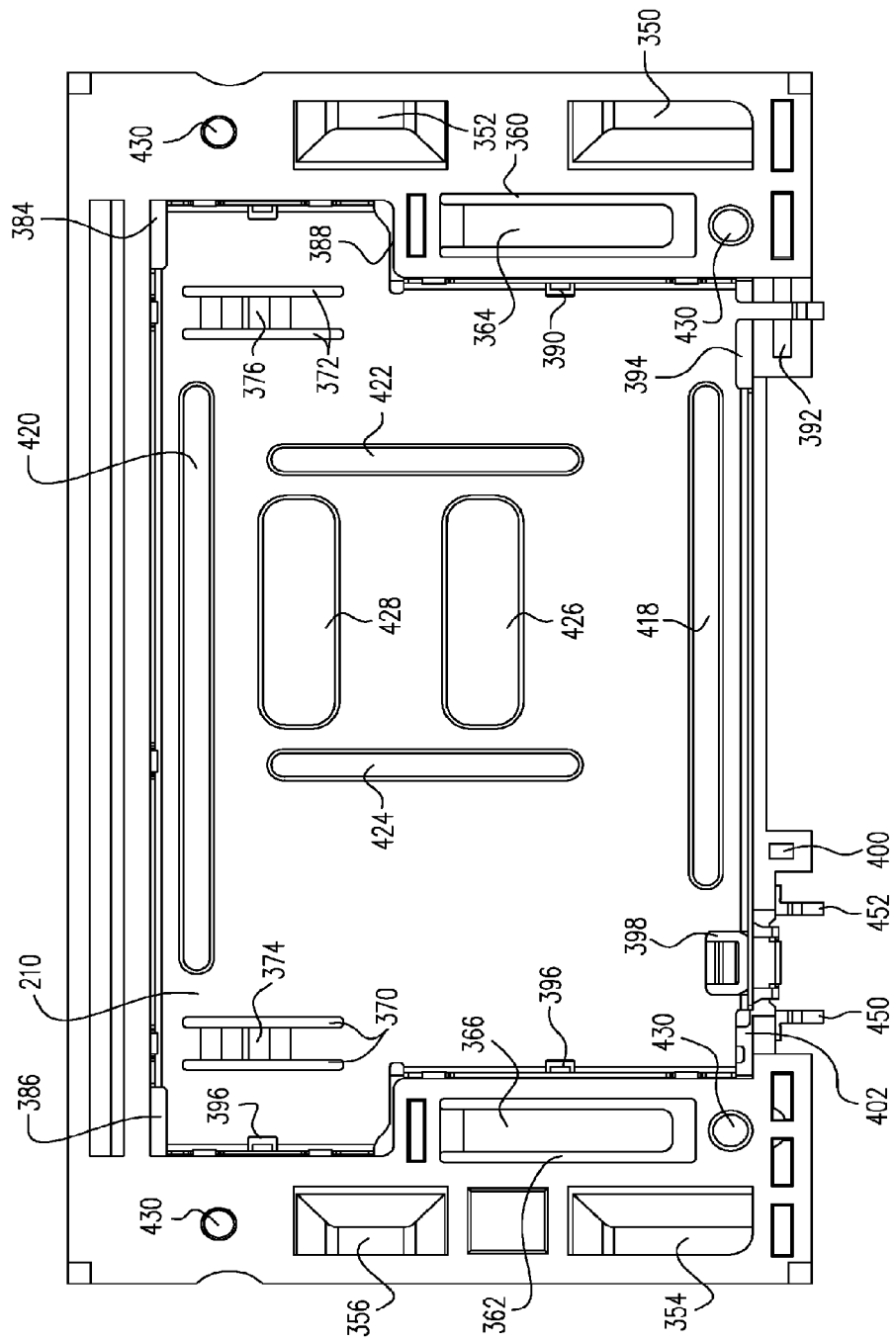

As seen particularly in FIG. 4C, bottom wall portion 210 includes four side apertures 350, 352, 354 and 356. Bottom wall portion 210 also includes a pair of mutually spaced U-shaped slits 360 and 362, which surround respective integrally formed spring fingers 364 and 366. Bottom wall portion 210 additionally includes two pairs of mutually spaced parallel slits 370 and 372 which surround respective integrally formed elongate leaf springs 374 and 376.

Additionally, bottom wall portion 210 includes a pair of relatively short slit apertures 384 and 386. Additionally, bottom wall portion 210 includes a plurality of additional apertures designated by reference numerals 388, 390, 392, 394, 396, 398, 400 and 402.

Bottom wall portion 210 includes first, second, third, fourth, fifth and sixth downwardly facing elongate shallow protrusions, respectively designated by reference numerals 418, 420, 422, 424, 426 and 428 and four downwardly facing leg protrusions 430.

Figure 4D:
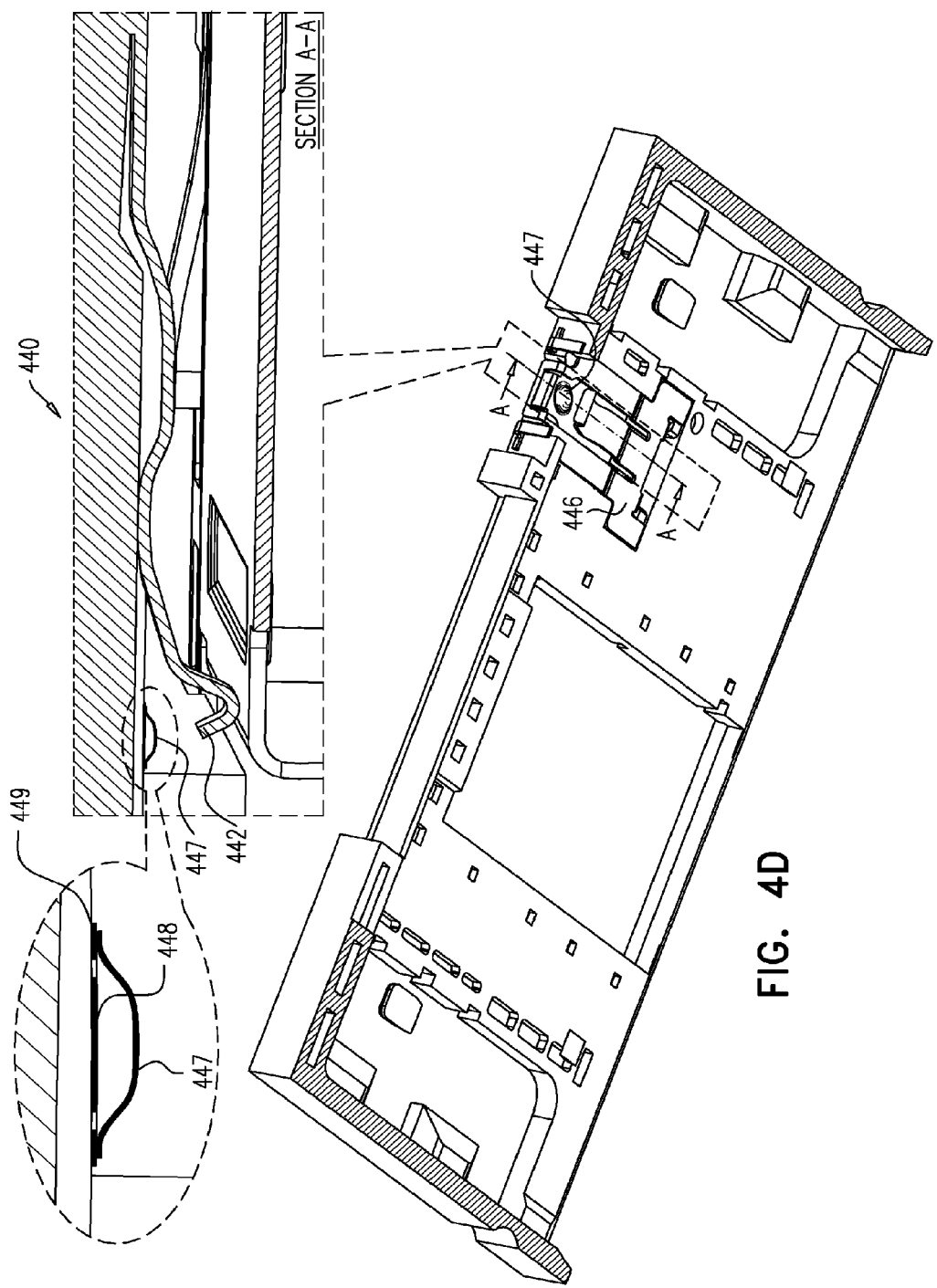
Figure 4E:
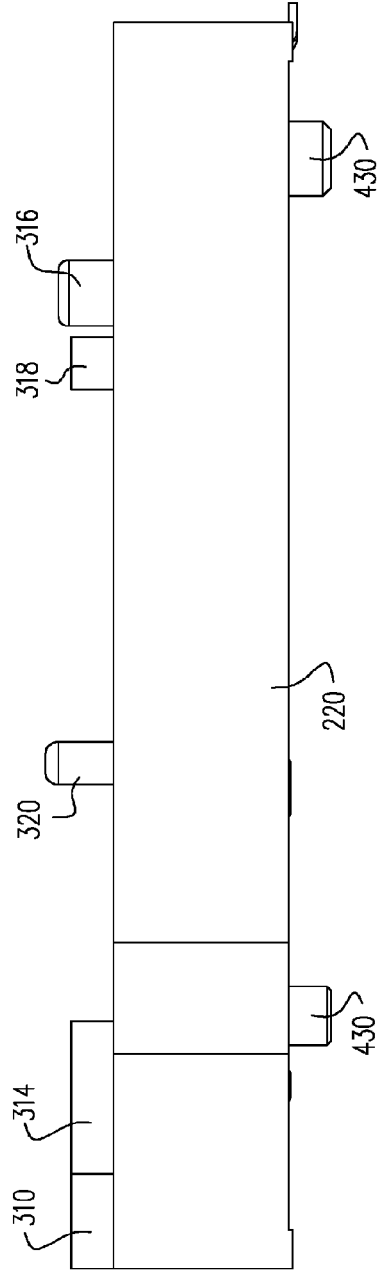
Figure 4F:
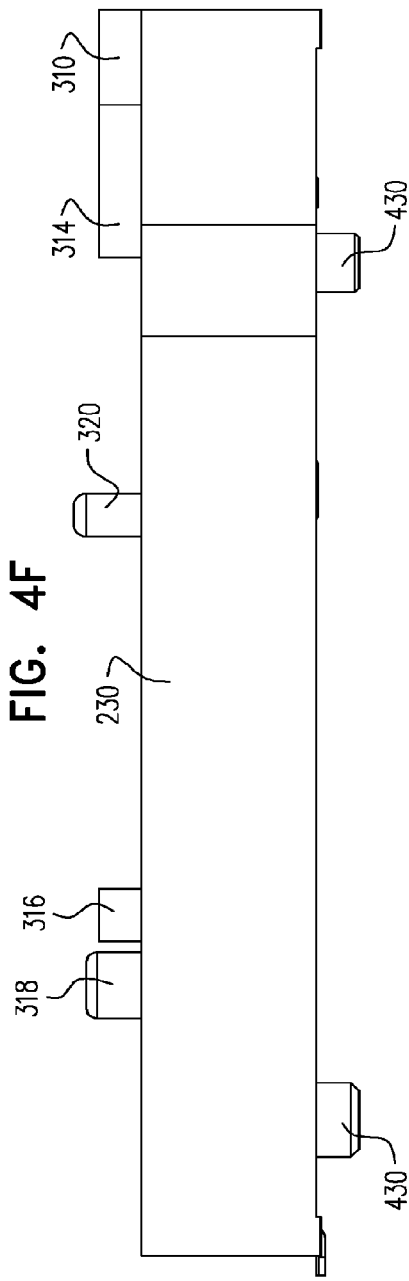
Figure 5A:
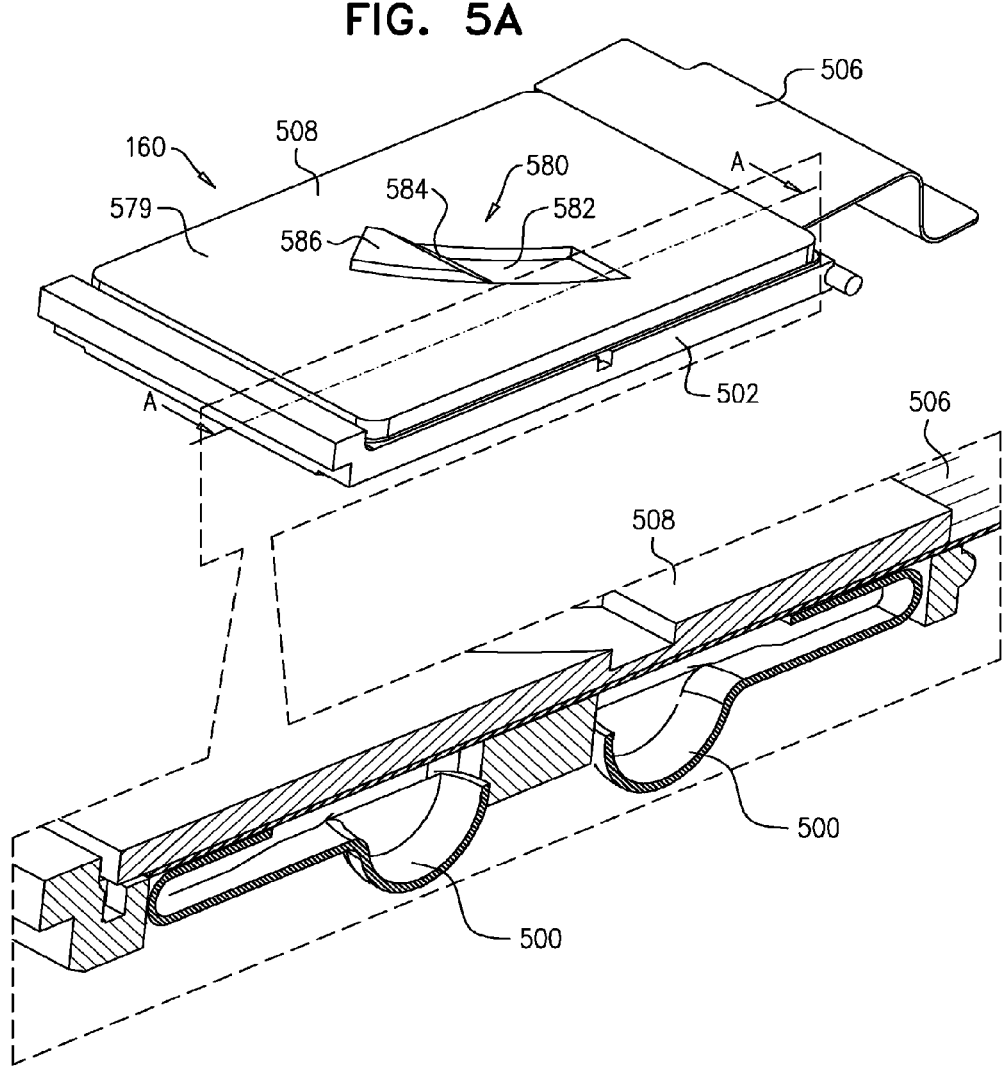
Figure 5B:
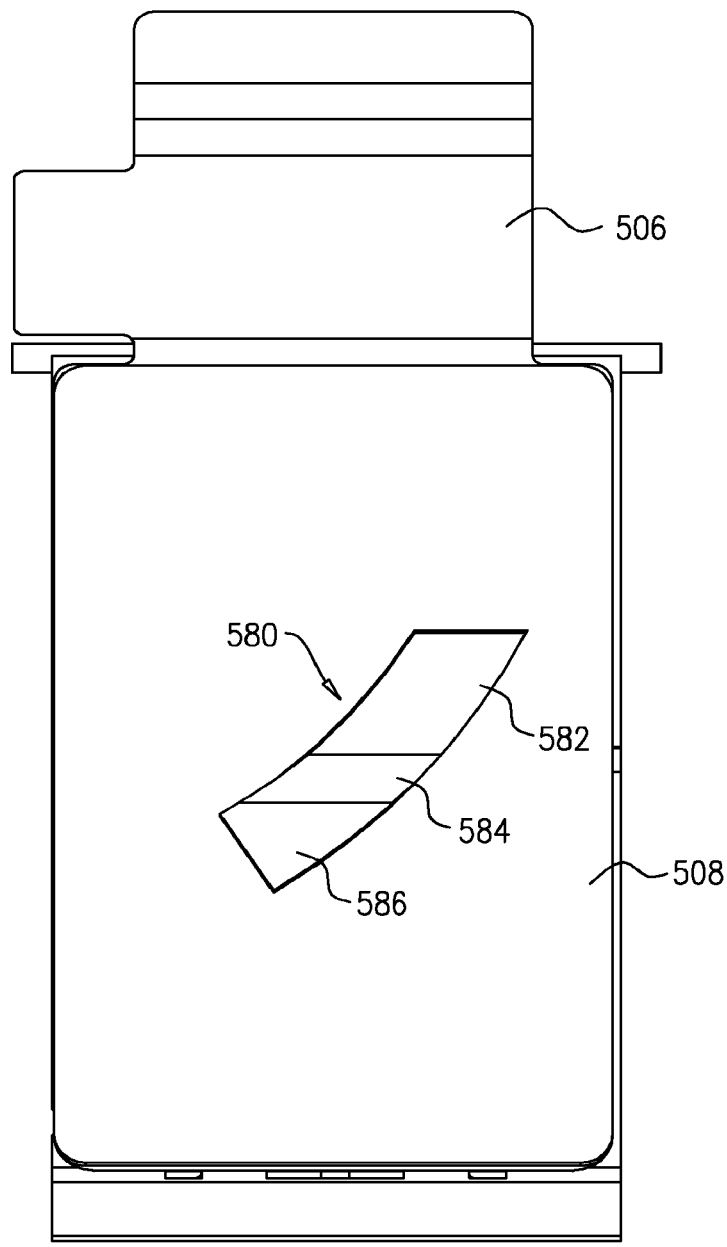
Figure 5C:
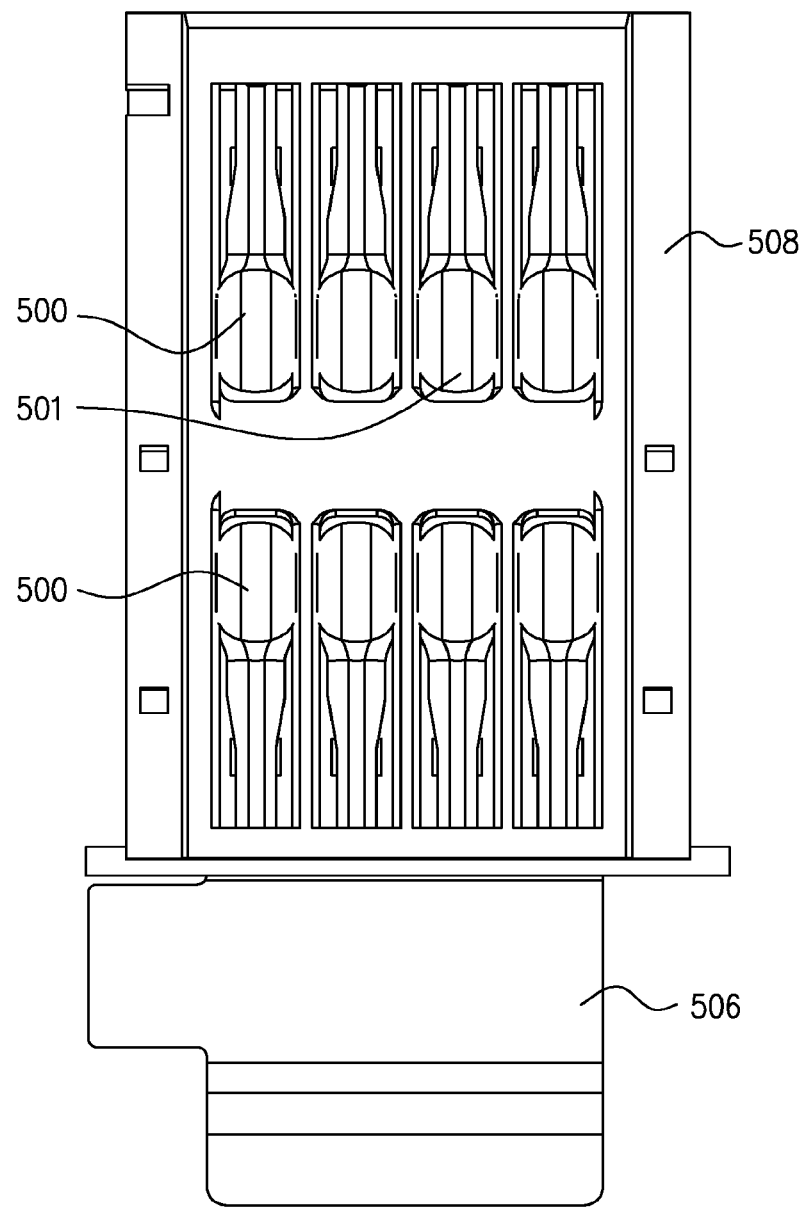
Figure 5F:
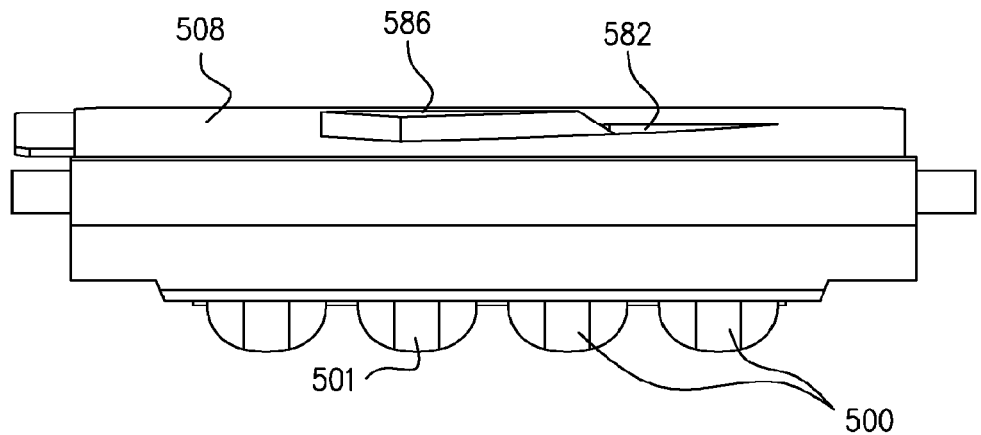
Figure 5G:
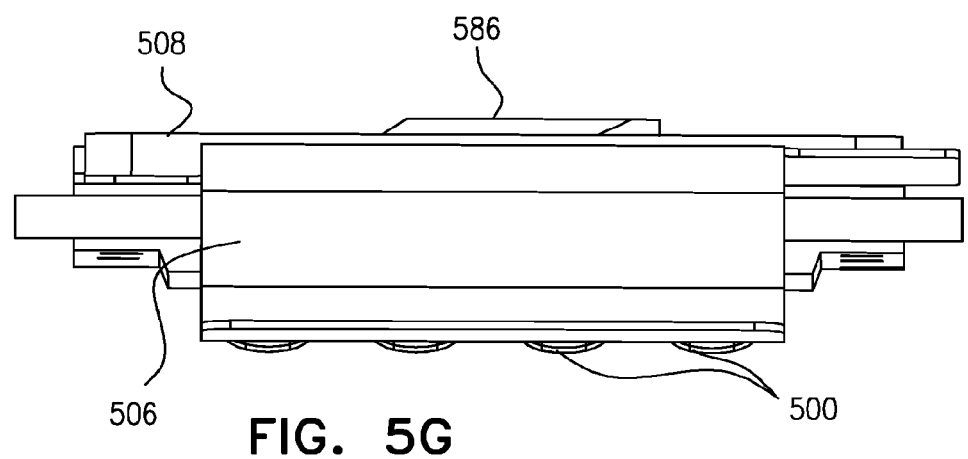
Figure 6A:
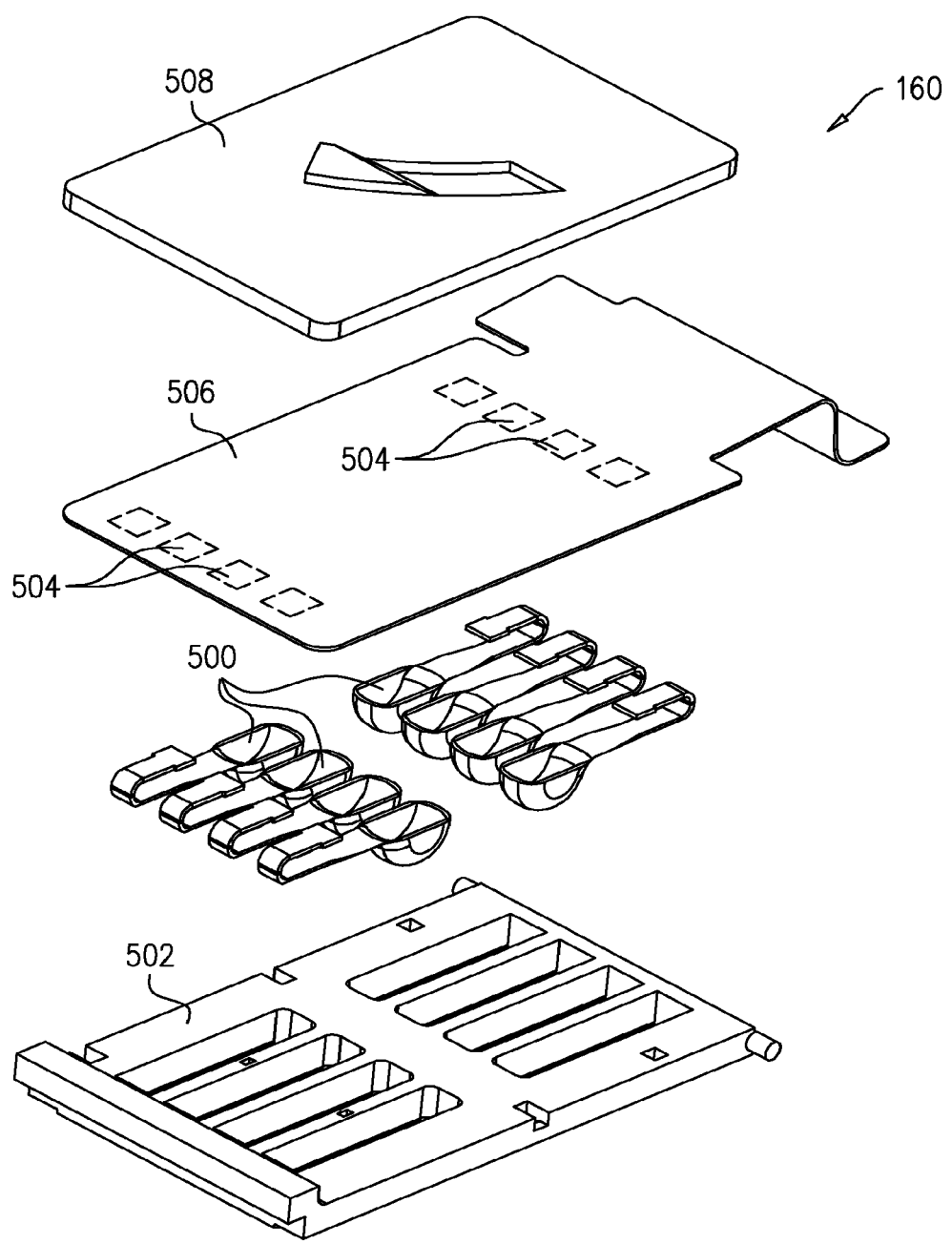
FIGS. 6A and 6B are simplified exploded view illustrations, taken generally in mutually opposite directions, of the contact block assembly of FIGS. 5A-5G.
Figure 6B:
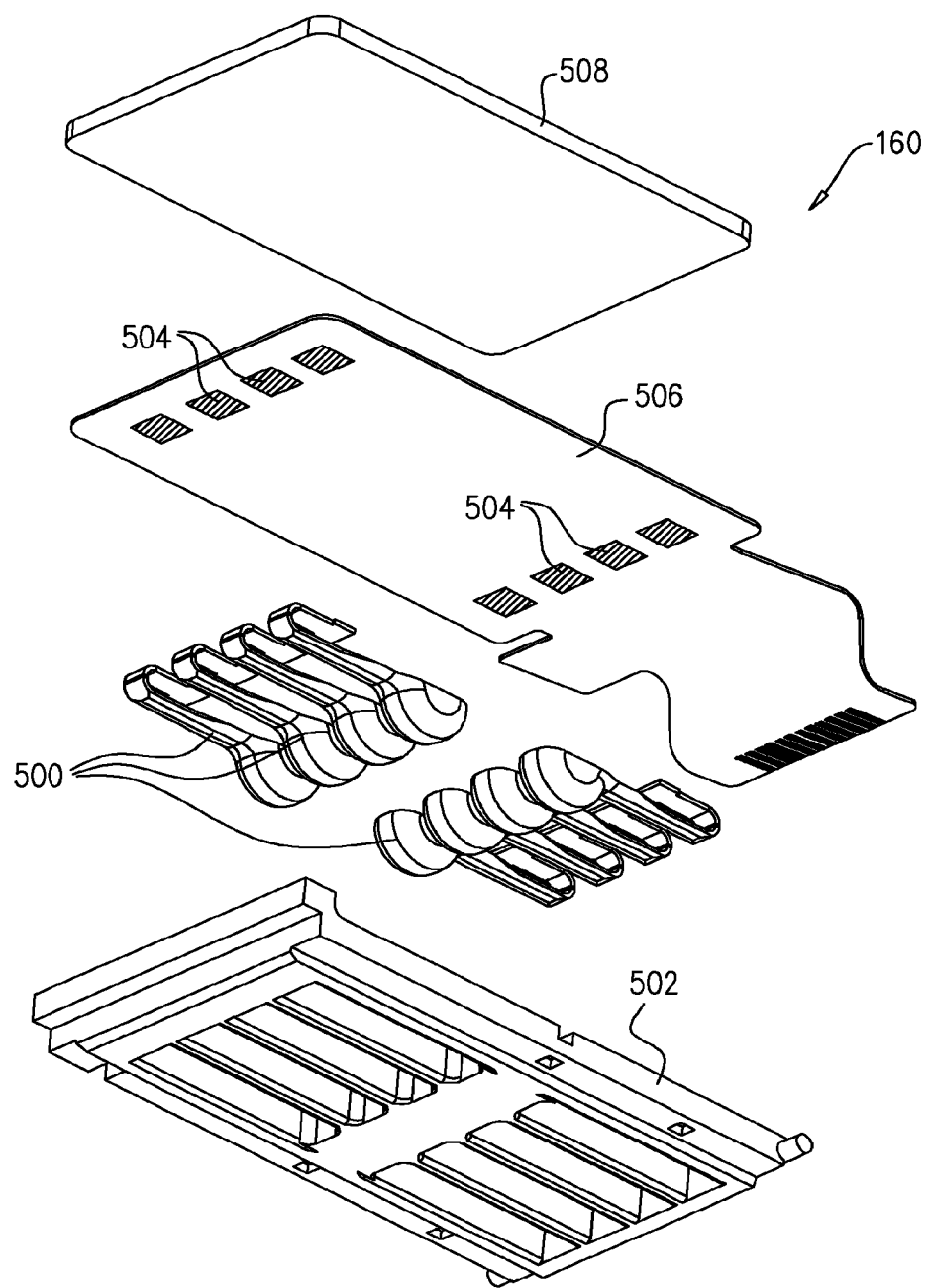
Figure 7A:
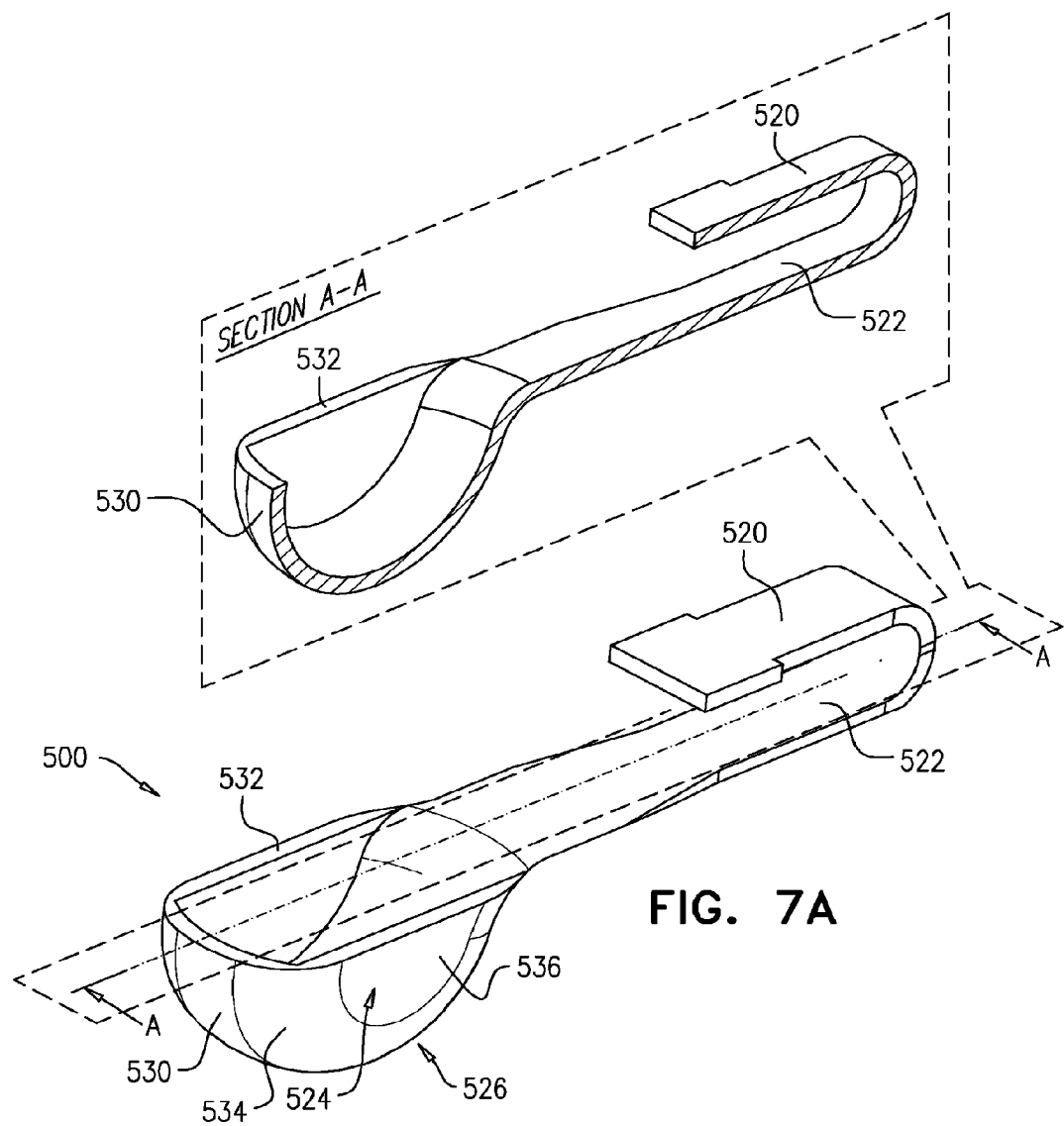
Figure 7B:
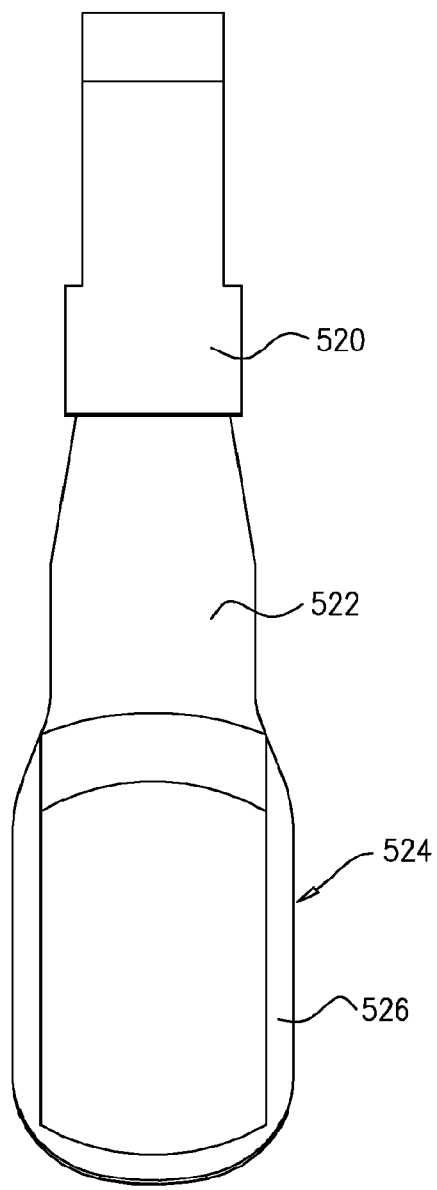
Figure 7C:
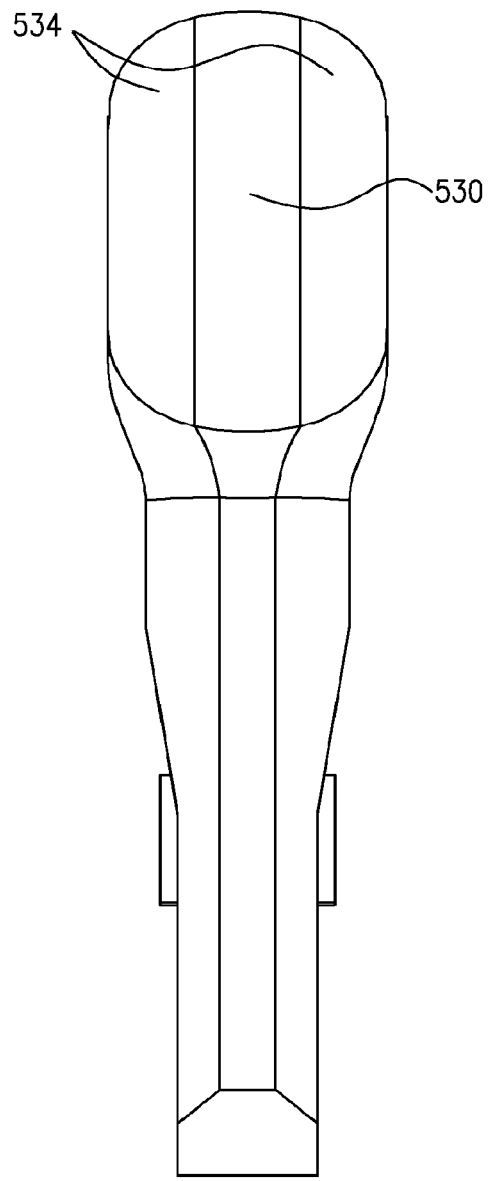
Figure 7F:
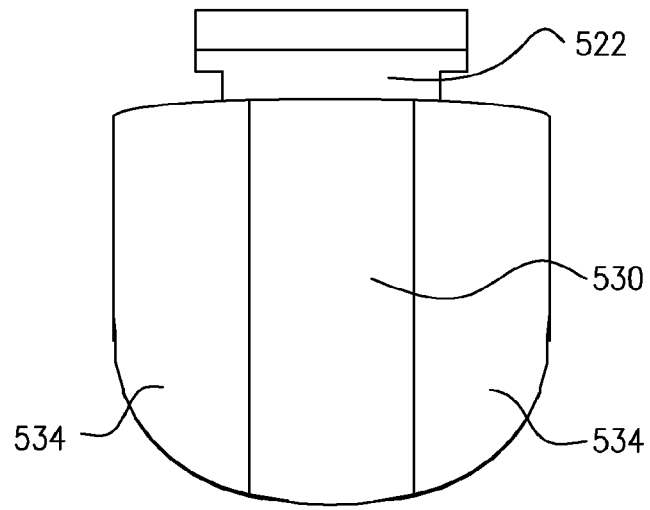
Figure 7G:
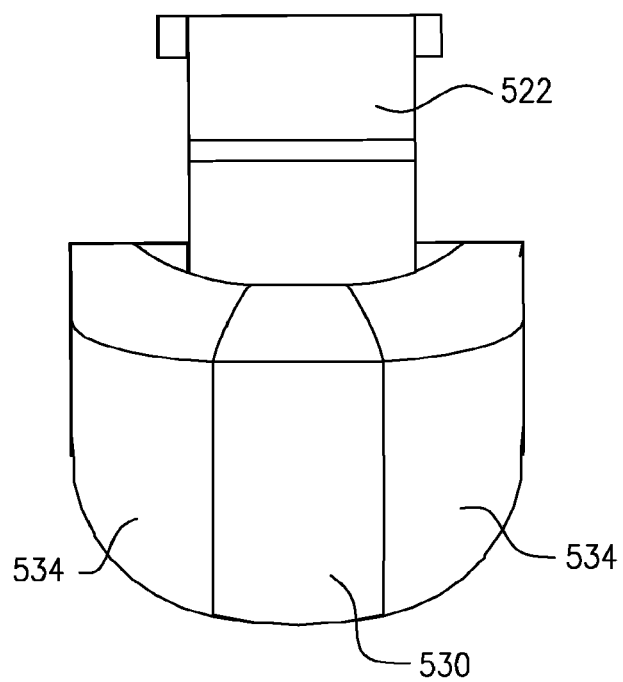
Figure 8A:
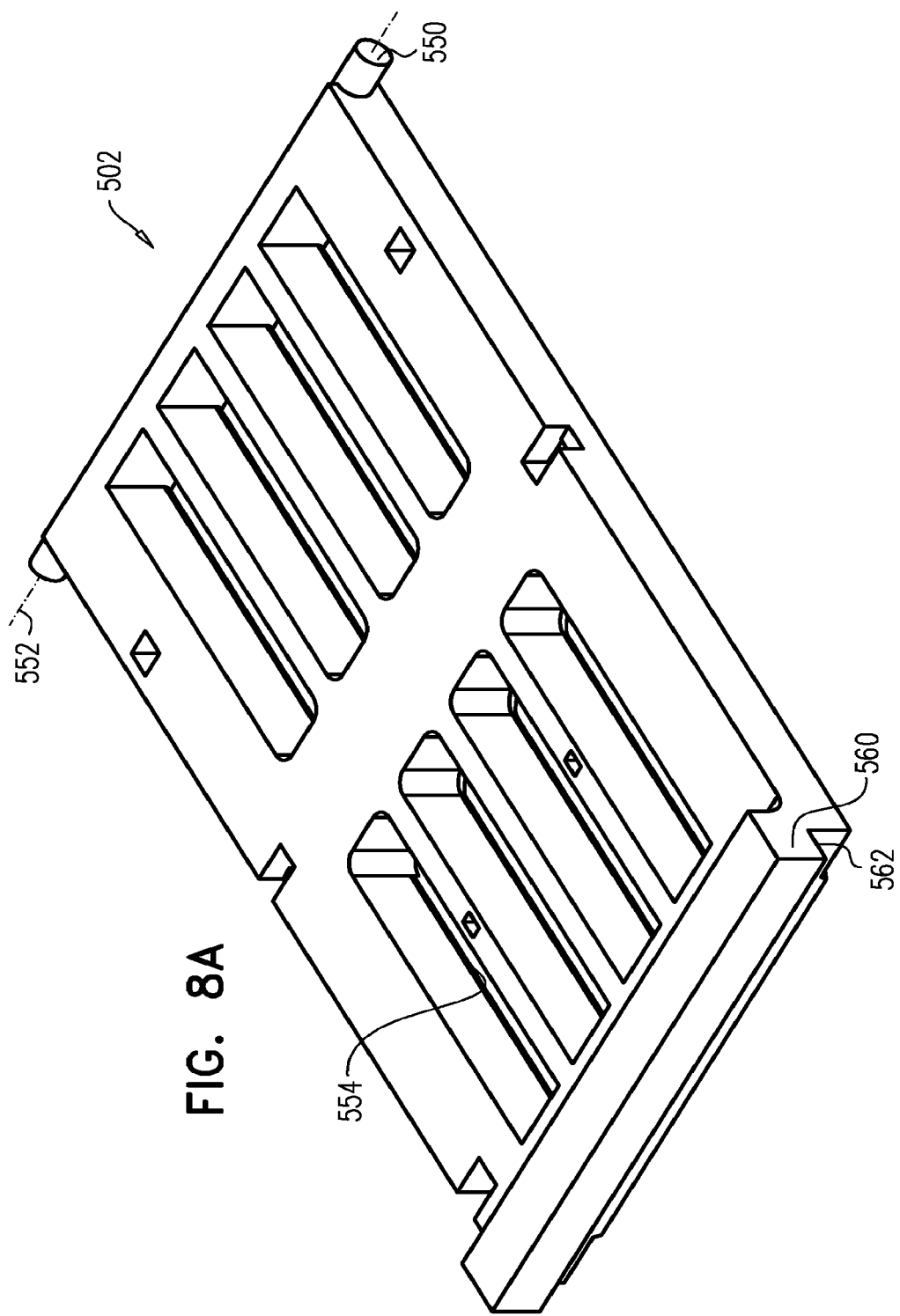
Figure 10A:
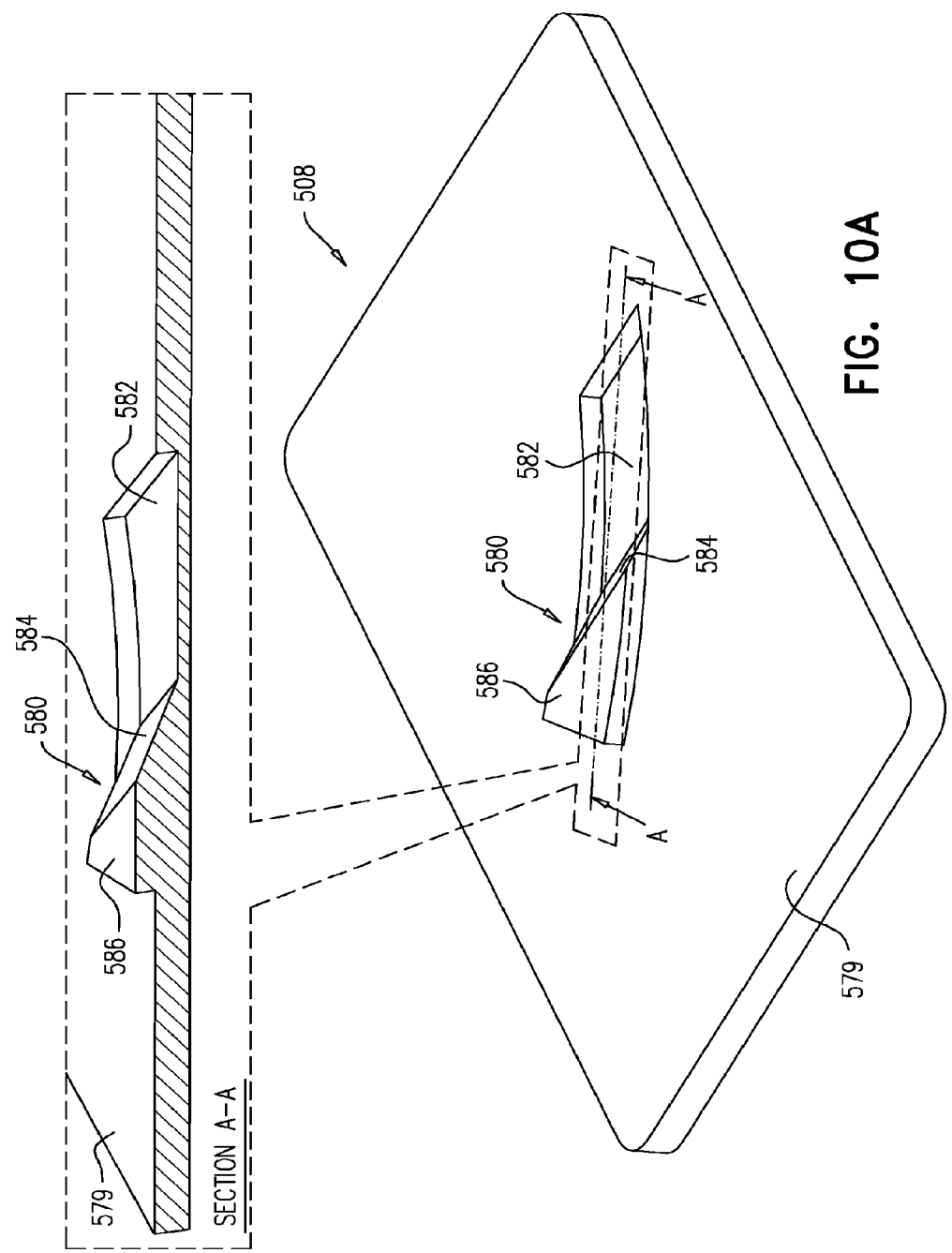
Figure 11A:
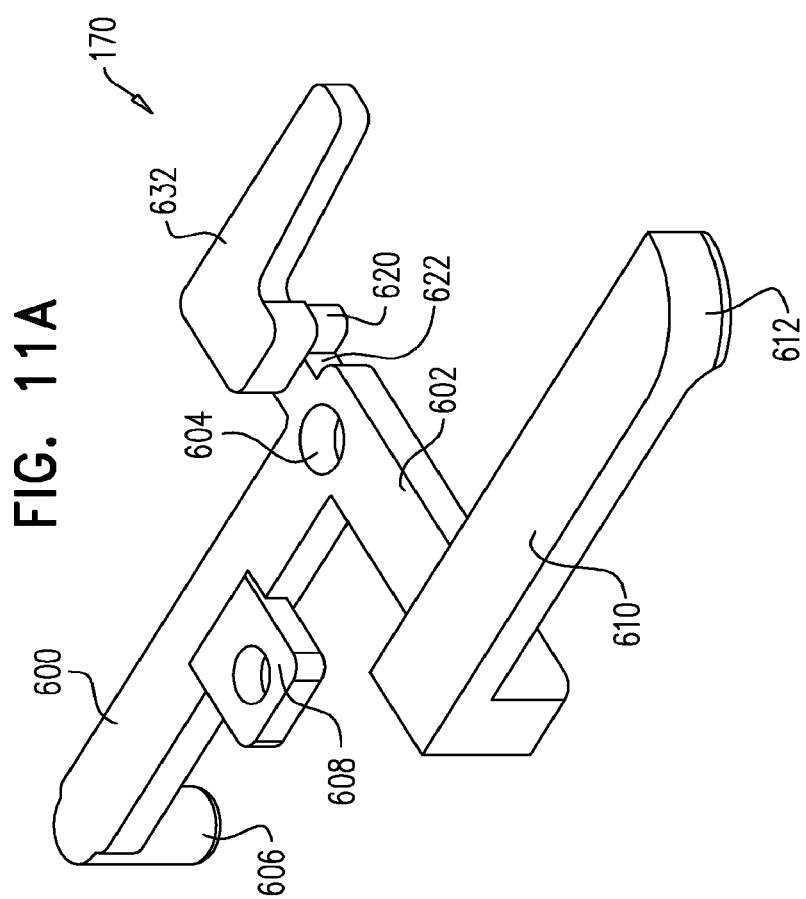

As seen particularly in FIG. 4D, there is provided a preferred embodiment of a card full insertion sensor 132 (FIG. 1), in the form of a card present switch assembly 440, which preferably includes a resilient card engagement bent finger 442. Bent finger 442 is preferably integrally formed with a generally planar mounting portion 446, which is mounted onto an inside facing surface of top wall portion 200 of base element 150. Bent finger 442 is normally spaced from an electrically conductive contact 447, preferably in the form of a dome, which is also mounted on an inside facing surface of top wall portion 200, and overlies a pair of mutually spaced electrical conductor pads, preferably, respectively, a central disk 448 surrounded by a ring 449, which is preferably electrically connected to contact 447.

Disk 448 and ring 449 are preferably electrically connected by conductors (not shown) via respective edge contacts 450 and 452 (FIG. 4C) to tamper alarm circuit 134, wherein closing of an electric circuit between disk 448 and ring 449 provides a smart card fully inserted output indication.

Reference is now made to FIGS. 5A, 5B, 5C, 5D, 5E, 5F and 5G, which are simplified drawings including respectively a perspective view, a top planar view, a bottom planar view, a first side planar view, a second side planar view, a front planar view and a back planar view of contact block assembly 160, forming part of the smart card connector of FIGS. 2A-3B, to FIGS. 6A and 6B, which are simplified exploded view illustrations, taken generally in mutually opposite directions, of the contact block assembly of FIGS. 5A-5G, and to FIGS. 7A-10B, which illustrate elements of the contact block assembly 160.

As seen in FIGS. 5A-6B, contact block assembly 160 includes a plurality of electrical contact elements 500, including at least one I/O contact 501, which are flexibly seated in an electrical contact element support 502 and electrically connected, as by soldering, to corresponding contact pads 504 on a flexible printed circuit element 506. A cam path defining element 508 is supported on electrical contact element support 502 and overlies part of flexible printed circuit element 506.

Referring additionally to FIGS. 7A-7G, it is seen that each electrical contact element 500 is a metal element, preferably formed by stamping, and preferably includes a contact pad portion 520, which is configured for soldered attachment to a contact pad 504 on flexible printed circuit element 506. A bent-over tail portion 522 connects contact pad portion 520 to a smart card contact engageable portion 524. It is a particular feature of an embodiment of the present invention that smart card contact engageable portion 524 is configured to be without a hook engageable surface, so as to be resistant to engagement therewith and pulling thereof by a tampering instrument inserted into the smart card ingress slit 110 (FIG. 1).

Smart card contact engageable portion 524 is preferably a side to side symmetric, generally hollow portion having an overall partial disk-like configuration and having a curved outer surface 526. Preferably, the curved outer surface 526 includes a curved, ribbon-like smart card contact engagement surface 530, which extends from bent-over tail portion 522 to a forward end of a top edge 532 of smart card contact engageable portion 524. Smart card contact engagement surface 530 preferably has an overall circular configuration and preferably has a curved cross section, as seen in a sectional illustration forming part of FIG. 7A, taken along the lines A-A in FIG. 7A.

Curved outer surface 526 also includes a pair of curved side surfaces 534 alongside both sides of smart card contact engagement surface 530. Curved outer surface 526 additionally includes a pair of generally flat side surfaces 536, which extend between curved side surfaces 534 and top edge 532.

Referring now specifically to FIGS. 8A-8G, it is seen that electrical contact element support 502 is a generally planar element, preferably injection molded of plastic to define at a first end thereof a pivot axle 550 extending along a pivot axis 552 and including an array of elongate recesses 554, preferably eight in number, each recess configured for accommodating an electrical contact element 500. Electrical contact element support 502 preferably defines at an end thereof opposite to that at which pivot axle 550 is located, a lip portion 560, which is engaged on an underside surface 562 thereof by leaf spring 162 for normally urging electrical contact element support 502 and thus contact block assembly 160 and electrical contact elements 500 into an upwardly pivoted operative orientation, which is resistant to tampering, when a smart card is not fully inserted into smart card receiving slot 112.

Referring now specifically to FIGS. 9A, 9B and 9C, it is seen that flexible printed circuit element 506 includes contact pads 504 on a main portion thereof 570. Flexible printed circuit element 506 also preferably includes an intermediate portion 572 and a tail portion 574 having formed adjacent an edge thereof an array of electrical contact pads 576.

Referring now specifically to FIGS. 10A, 10B, 10C, 10D, 10E, 10F and 10G, which are, respectively, a perspective view, a top planar view, a bottom planar view, a first side planar view, a second side planar view, a front planar view and a back planar view of cam path defining element 508, it is seen that cam path defining element 508 is a generally planar element having a generally planar top surface 579, which is formed with a partially recessed, partially protruding cam surface 580. Cam surface 580 includes three regions, a recessed region 582 having a uniform depth and a region 584 angled with respect to recessed region 582 and defining a ramp extending from recessed region 582 to a protruding region 586, having a uniform height.

Reference is now made to FIGS. 11A, 11B, 11C, 11D, 11E, 11F and 11G, which are simplified drawings including, respectively, a perspective view, a top planar view, a bottom planar view, a first side planar view, a second side planar view, a front planar view and a back planar view of actuation arm 170, forming part of the smart card connector of FIGS. 2A-3B.

As seen in FIGS. 11A-11G, actuation arm 170 comprises first and second elongate arm portions 600 and 602 which extend in a first plane preferably at right angles to each other. A pivot aperture 604 is located at the junction of arm portions 600 and 602 and is arranged for pivotable engagement with upwardly facing protrusion 316 of base element 150. Arm portion 600 terminates in a generally cylindrical payment card engagement protrusion 606, which depends from arm portion 600. Extending sideways and somewhat upwardly from arm portion 600 at an intermediate location therealong is an apertured spring engagement portion 608, which is arranged to be engaged by tension coil spring 172.

Arm portion 602 terminates at one end thereof in a cam arm portion 610, which preferably extends generally perpendicular to arm portion 602 and parallel to arm portion 600 in a second plane, above and parallel to the first plane in which arm portions 600 and 602 are located. As seen particularly in FIG. 11C, cam arm portion 610 terminates in a depending tapered cam finger portion 612 having a generally planar cam engagement surface 614, which is configured for slidable engagement with partially recessed, partially protruding cam surface 580 of cam path defining element 508.

Arm portion 602 terminates at an opposite end thereof in a mechanical sensor toggle engagement finger portion 620, which defines a recess 622 bordered by edge surfaces 624, 626 and 628. Edge surface 628 is preferably in the form of a curved fingertip surface of a finger portion 630.

Overlying finger portion 630, edge surface 628 and part of edge surface 626 is an optical sensor selectable light reflecting finger portion 632, which lies in a third plane, above and parallel to the first plane in which arm portions 600 and 602 are located and below and parallel to the second plane in which cam portion 610 is located, and extends generally parallel to arm portions 600 and 610.

Figure 12A:
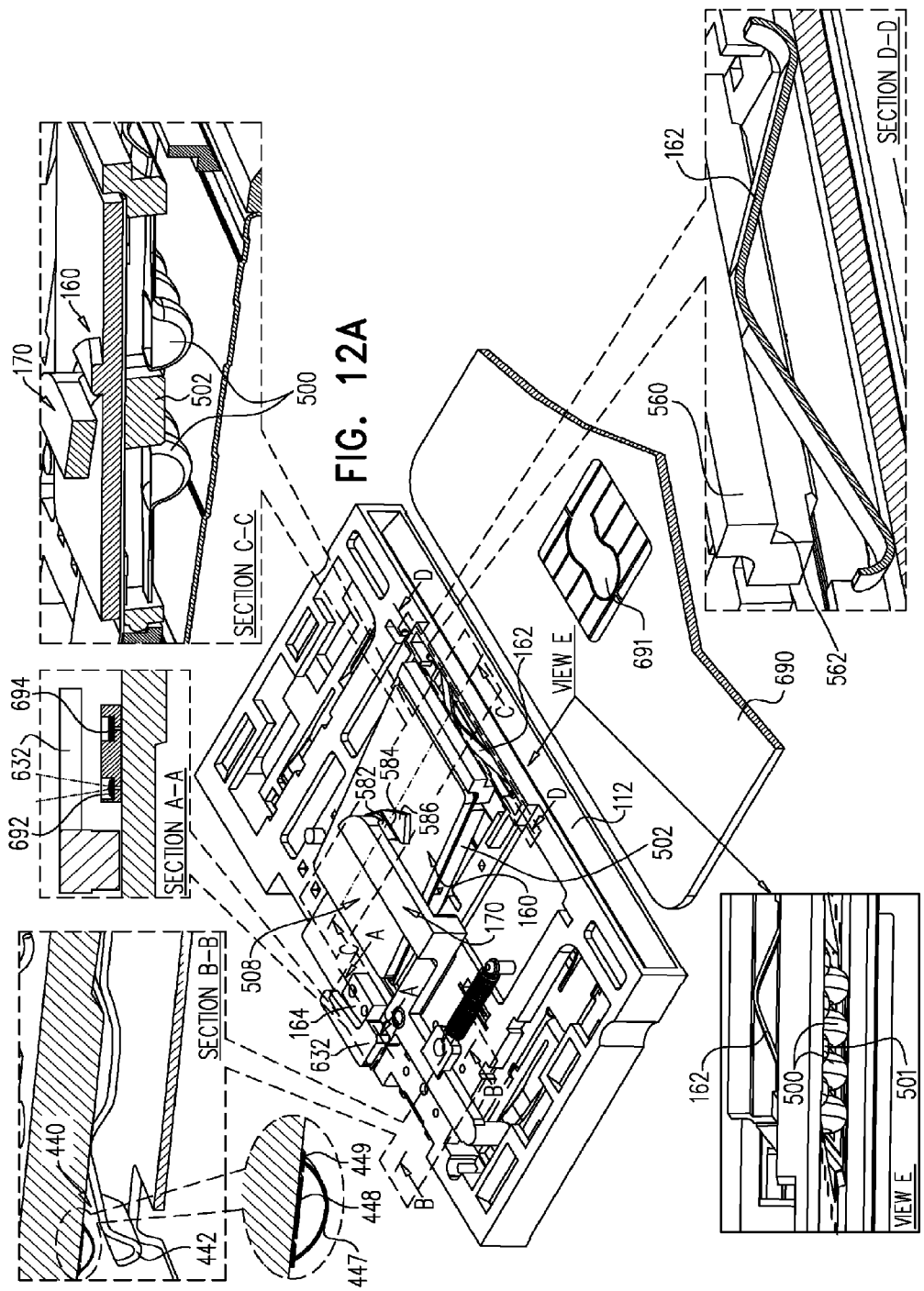
FIGS. 12A and 12B are simplified perspective view illustrations illustrating a transition of the smart card connector of FIGS. 1-11G from a card not inserted state to a card fully inserted state.
Figure 12B:
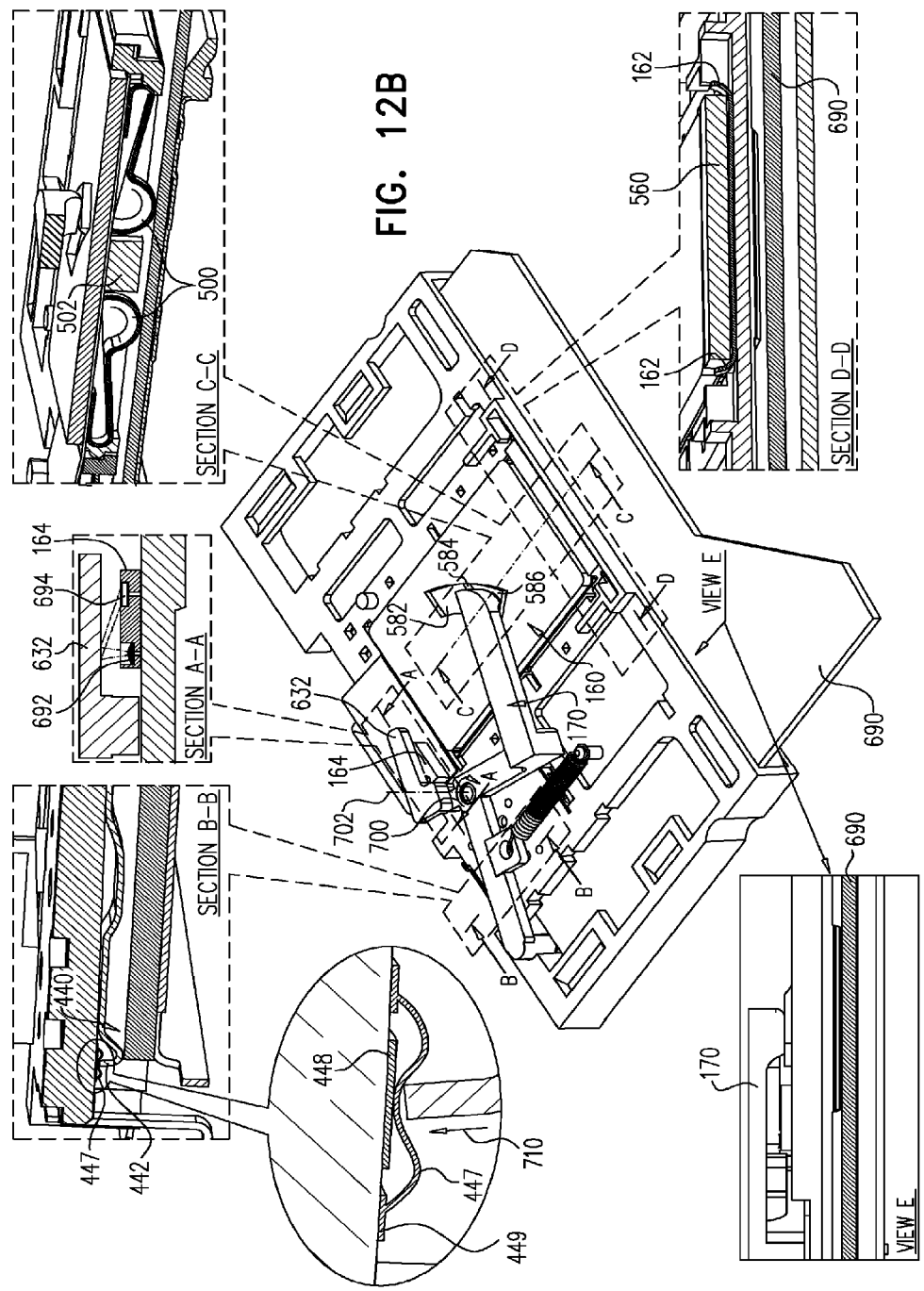

Reference is now made to FIGS. 12A and 12B, which are simplified perspective view illustrations illustrating a transition of the smart card connector of FIGS. 1-11G from a card not inserted state to a card fully inserted state.

As seen in FIG. 12A, where a smart card 690 having contact pads 691 is located outside of smart card receiving slot 112, actuation arm 170 is in its at rest position, as seen in FIG. 2A, and light reflecting finger portion 632 does not overlie the optical sensor 164 and thus does not reflect light emitted thereby by an LED 692 to a detector 694 thereof, as seen particularly in enlargement A, which shows a simplified section of optical sensor 164 and a light beam emanating therefrom which is not reflected by finger portion 632. In this situation, optical sensor 164 is in a first logic state, which indicates to tamper alarm circuit 134 that card engagement contacts 500, and specifically at least one I/O contact 501, are in a retracted operative orientation.

In the absence of a card in smart card receiving slot 112, the card present switch assembly 440 is in its at rest position, as seen in FIG. 4D, and the bent finger 442 is spaced from electrically conductive contact 447, as seen particularly in enlargement B, which shows a simplified cross section of the bent finger 442 and electrically conductive contact 447. Bent finger 442 is not resiliently displaced into deforming engagement with electrically conductive contact 447, and central disk 448 is not in electrical contact with ring 449 causing a smart card not inserted output indication to be provided to tamper alarm circuit 134.

In the absence of a card in smart card receiving slot 112, when actuation arm 170 is in its at rest position, the cam finger portion 612 of the actuation arm 170 is in engagement with recessed region 582 of cam surface 580 defined on cam path defining element 508. When in this position, actuation arm 170 preferably does not exert any downward pressure on contact block assembly 160, and thus contact block assembly 160 remains in its upwardly retracted operative orientation, as seen particularly in enlargement C, which is side view illustration, taken along lines C-C in FIG. 12A.

In the absence of a card in smart card receiving slot 112, when actuation arm 170 is in its at rest position and the cam finger portion 612 of the actuation arm 170 is in engagement with recessed region 582 of cam surface 580 defined on cam path defining element 508, leaf spring 162 is in its extended operative orientation, as seen particularly in enlargement D, which is a cross section taken along lines D-D in FIG. 12A. Leaf spring 162 engages underside surface 562 of lip portion 560 of electrical contact element support 502 and thereby urges electrical contact element support 502, and thus contact block assembly 160 and electrical contact elements 500, into their upwardly pivoted operative orientation, which is resistant to tampering.

In the absence of a smart card 690 in smart card receiving slot 112, when contact block assembly 160 is in its upwardly retracted operative orientation, electrical contact elements 500, and specifically at least one I/O contact 501, are nearly completely retracted upwardly out of smart card receiving slot 112, as seen particularly in enlargement E, which is taken along arrow E. It is a particular feature of an embodiment of the present invention that in the absence of a card in smart card receiving slot 112, the electrical contact elements 500, and specifically at least one I/O contact 501, are nearly completely retracted upwardly out of smart card receiving slot 112, thereby making it difficult for a potential hacker to engage the electrical contact elements 500.

It is a further particular feature of an embodiment of the present invention that in addition to the retraction of the electrical contact elements 500 when a card is not fully inserted into smart card receiving slot 112, the particular configuration of the electrical contact elements 500, so as to be without a hook engageable surface, makes it difficult to tamper with the electrical contact elements 500 in general and the one or more I/O contact elements 501 in particular.

Turning now to FIG. 12B, which shows the operative orientation of the secure smart card connector assembly 120 when a smart card 690 is fully inserted in smart card receiving slot 112, actuation arm 170 is fully rotated in a clockwise rotation direction 700 about an actuation arm rotation axis 702 defined by protrusion 316 (FIG. 4A) which extends through pivot aperture 604 (FIG. 11A) from its at rest position, as seen in FIGS. 2A and 12A, to a fully rotated position seen in FIG. 12B. When actuation arm 170 is in this fully rotated position, as seen particularly in enlargement A, light reflecting finger portion 632 overlies the optical sensor 164 and thus a light beam emanating from LED 692 of optical sensor 164 is reflected by finger portion 632 to detector 694 of optical sensor 164. In this situation, optical sensor 164 is in a second logic state, which indicates to tamper alarm circuit 134 that card engagement contacts 500, and specifically at least one I/O contact 501, are in an extended operative orientation.

When a smart card 690 is fully inserted into smart card receiving slot 112, bent finger 442 is resiliently displaced into deforming engagement with electrically conductive contact 447, as indicated by an arrow 710, causing it to contact central disk 448, as seen particularly in enlargement B, which shows a simplified cross section of the bent finger 442 and electrically conductive contact 447. Accordingly, an electrical connection is made between disk 448 and ring 449, and thus between edge contacts 450 and 452, thereby providing a smart card fully inserted output indication to tamper alarm circuit 134.

When a smart card 690 is fully inserted in smart card receiving slot 112, and actuation arm 170 is in its fully rotated position, the cam finger portion 612 of the actuation arm 170 is in engagement with protruding region 586 of cam surface 580 defined on cam path defining element 508. When in this position, actuation arm 170 preferably exerts downward pressure on contact block assembly 160, and thus contact block assembly 160 is in its pivotally lowered operative orientation, as seen particularly in enlargement C, which is a side view illustration, taken along lines C-C in FIG. 12B.

When a smart card 690 is fully inserted in smart card receiving slot 112, actuation arm 170 is in its fully rotated position and the cam finger portion 612 of the actuation arm 170 is in engagement with protruding region 586 of cam surface 580 defined on cam path defining element 508. Rotation of actuation arm 170 causes downward pivoting of electrical contact element support 502 which overcomes the upward force of leaf spring 162 and underside surface 562 of lip portion 560 of electrical contact element support 502 compresses leaf spring 162 into a compressed operative orientation, as seen particularly in enlargement D, which is a cross section taken along lines D-D. In the compressed operative orientation, access to electrical contact elements 500 is blocked by the smart card 690, which is fully inserted into smart card receiving slot 112.

When a smart card 690 is fully inserted in smart card receiving slot 112, contact block assembly 160 is in its pivotally lowered operative orientation and electrical contact elements 500, and specifically at least one I/O contact 501, are at least partly located within smart card receiving slot 112 and in engagement with contact pads 691 on the smart card 690, as seen particularly in enlargement E, which is taken along arrow E. It is a particular feature of an embodiment of the present invention that only in the presence of a card in smart card receiving slot 112, are the electrical contact elements 500, and specifically at least one I/O contact 501, lowered into conductive engagement with contact pads of the card, thereby making it difficult for a potential hacker to engage the electrical contact elements 500.

It is a further particular feature of an embodiment of the present invention that in addition to the lowering and extension of the electrical contact elements 500 into the smart card receiving slot 112 only when a smart card is fully inserted into smart card receiving slot 112, the particular configuration of the electrical contact elements 500, so as to be without a hook engageable surface, makes it difficult to tamper with the electrical contact elements 500 in general and the one or more I/O contact elements 501 in particular.

Figure 13B:
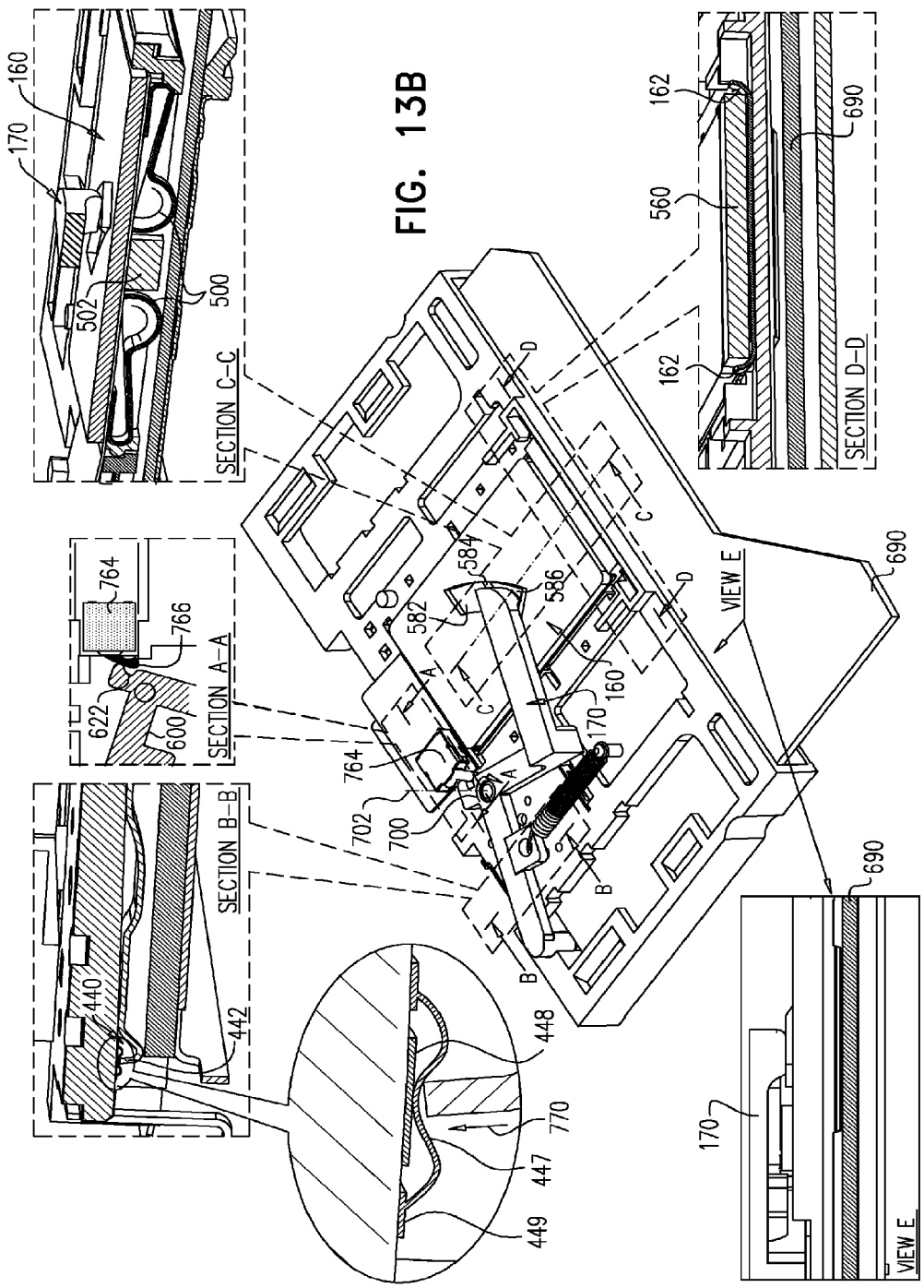

Reference is now made to FIGS. 13A and 13B, which are simplified perspective view illustrations illustrating a transition of the smart card connector of an alternative embodiment of the invention from a card not inserted state to a card fully inserted state. The alternative embodiment of the invention is generally identical to that described hereinabove with reference to FIGS. 1-12B with the sole difference being that the optical sensor 164 is replaced by a mechanical sensor 764 having an engagement finger 766.

As seen in FIG. 13A, where a smart card 690 having contact pads 691 is located outside of smart card receiving slot 112, actuation arm 170 is in its at rest position and engagement finger 766 of mechanical sensor 764 lies within recess 622 (FIG. 11C) of actuation arm 170, as seen particularly in enlargement A, which shows a partially cut away top view of mechanical sensor 764 and recess 622. When engagement finger 766 is in this orientation, mechanical sensor 764 is in a first logic state, which indicates to tamper alarm circuit 134 that card engagement contacts 500, and specifically at least one I/O contact 501, are in a retracted operative orientation.

In the absence of a card in smart card receiving slot 112, the card present switch assembly 440 is in its at rest position, as seen in FIG. 4D, and the bent finger 442 is spaced from electrically conductive contact 447, as seen particularly in enlargement B, which shows a simplified cross section of the bent finger 442 and electrically conductive contact 447. Bent finger 442 is not resiliently displaced into deforming engagement with electrically conductive contact 447, and central disk 448 is not in electrical contact with ring 449 causing a smart card not inserted output indication to be provided to tamper alarm circuit 134.

In the absence of a card in smart card receiving slot 112, when actuation arm 170 is in its at rest position, the cam finger portion 612 of the actuation arm 170 is in engagement with recessed region 582 of cam surface 580 defined on cam path defining element 508. When in this position, actuation arm 170 preferably does not exert any downward pressure on contact block assembly 160, and thus contact block assembly 160 remains in its upwardly retracted operative orientation, as seen particularly in enlargement C, which is side view illustration, taken along an arrow C.

In the absence of a card in smart card receiving slot 112, when actuation arm 170 is in its at rest position and the cam finger portion 612 of the actuation arm 170 is in engagement with recessed region 582 of cam surface 580 defined on cam path defining element 508, leaf spring 162 is in its extended operative orientation, as seen particularly in enlargement D, which is a cross section taken along lines D-D in FIG. 13A. Leaf spring 162 engages underside surface 562 of lip portion 560 of electrical contact element support 502 and thereby urges electrical contact element support 502, and thus contact block assembly 160 and electrical contact elements 500, into their upwardly pivoted operative orientation, which is resistant to tampering.

In the absence of a smart card 690 in smart card receiving slot 112, when contact block assembly 160 is in its upwardly retracted operative orientation, electrical contact elements 500, and specifically at least one I/O contact 501, are nearly completely retracted upwardly out of smart card receiving slot 112, as seen particularly in enlargement E, which is taken along arrow E. It is a particular feature of an embodiment of the present invention that in the absence of a card in smart card receiving slot 112, the electrical contact elements 500, and specifically at least one I/O contact 501, are nearly completely retracted upwardly out of smart card receiving slot 112, thereby making it difficult for a potential hacker to engage the electrical contact elements 500.

It is a further particular feature of an embodiment of the present invention that in addition to the retraction of the electrical contact elements 500 when a card is not fully inserted into smart card receiving slot 112, the particular configuration of the electrical contact elements 500, so as to be without a hook engageable surface, makes it difficult to tamper with the electrical contact elements 500 in general and the one or more I/O contact elements 501 in particular.

Turning now to FIG. 13B, which shows the operative orientation of the secure smart card connector assembly 120 when a card 690 is fully inserted in smart card receiving slot 112, actuation arm 170 is fully rotated in clockwise rotation direction 700 about an actuation arm rotation axis 702 defined by protrusion 316 (FIG. 4A) which extends through pivot aperture 604 (FIG. 11A) from its at rest position, as seen in FIG. 13A, to a fully rotated position seen in FIG. 13B. When actuation arm 170 is in this fully rotated position engagement finger 766 of mechanical sensor 764 lies outside recess 622 (FIG. 11C) of actuation arm 170 and engages edge surface 628 of finger portion 630 of actuation arm 170, as seen particularly in enlargement A, which shows a partially cut away top view of mechanical sensor 764 and recess 622. It is seen that engagement finger 766 has been pivoted relative to the remainder of mechanical sensor 764, such that the mechanical sensor is in a second logic state which indicates that electrical contact elements 500, and specifically at least one I/O contact 501, are in an extended state.

When a smart card 690 is fully inserted into smart card receiving slot 112, bent finger 442 is resiliently displaced into deforming engagement with electrically conductive contact 447, as indicated by an arrow 770, causing it to contact central disk 448, as seen particularly in enlargement B, which shows a simplified cross section of the bent finger 442 and electrically conductive contact 447. Accordingly an electrical connection is made between disk 448 and ring 449, and thus between edge contacts 450 and 452, thereby providing a smart card fully inserted output indication to tamper alarm circuit 134.

When a smart card 690 is fully inserted in smart card receiving slot 112, when actuation arm 170 is in its fully rotated position, the cam finger portion 612 of the actuation arm 170 is in engagement with protruding region 586 of cam surface 580 defined on cam path defining element 508. When in this position, actuation arm 170 preferably exerts downward pressure on contact block assembly 160, and thus contact block assembly 160 is in its pivotally lowered operative orientation, as seen particularly in enlargement C, which is side view illustration, taken along line C-C.

When a smart card 690 is fully inserted in smart card receiving slot 112, actuation arm 170 is in its fully rotated position and the cam finger portion 612 of the actuation arm 170 is in engagement with protruding region 586 of cam surface 580 defined on cam path defining element 508. Rotation of actuation arm 170 causes downward pivoting of electrical contact element support 502 which overcomes the upward force of leaf spring 162 and underside surface 562 of lip portion 560 of electrical contact element support 502 compresses leaf spring 162 into a compressed operative orientation, as seen particularly in enlargement D, which is a cross section taken along lines D-D in FIG. 13B. In the compressed operative orientation, access to electrical contact elements 500 is blocked by the smart card 690, which is fully inserted into smart card receiving slot 112.

When a smart card 690 is fully inserted in smart card receiving slot 112, when contact block assembly 160 is in its pivotally lowered operative orientation, electrical contact elements 500, and specifically at least one I/O contact 501, are at least partly located within smart card receiving slot 112 and in engagement with contact pads 691 on the smart card 690, as seen particularly in enlargement E, which is taken along arrow E. It is a particular feature of an embodiment of the present invention that only in the presence of a card in smart card receiving slot 112, are the electrical contact elements 500, and specifically at least one I/O contact 501, lowered into conductive engagement with contact pads of the card, thereby making it difficult for a potential hacker to engage the electrical contact elements 500.

It is a further particular feature of an embodiment of the present invention that in addition to the lowering and extension of the electrical contact elements 500 into the smart card receiving slot 112 only when a smart card is fully inserted into smart card receiving slot 112, the particular configuration of the electrical contact elements 500, so as to be without a hook engageable surface, makes it difficult to tamper with the electrical contact elements 500 in general and the one or more I/O contact elements 501 in particular.

It is an additional particular feature of an embodiment of the present invention that an alarm is provided when electrical contact elements 500 are extended into the smart card receiving slot 112 in the absence of a card fully inserted into smart card receiving slot 112.

Preferably the alarm logic provided by tamper alarm circuit 134 may be summarized as seen in Table 1 below:

TABLE 1

| CARD PRESENT IN SLOT (SENSOR 132) | CONTACT ELEMENTS EXTENDED INTO SLOT (SENSOR 130) | ALARM YES/NO |
|---|---|---|
| YES | NO | YES |
| YES | YES | NO |
| NO | NO | NO |
| NO | YES | YES |

It will be appreciated by persons skilled in the art that the present invention is not limited by what has been particularly claimed and includes both combinations and subcombinations of features described and shown hereinabove as well as modifications thereof which are not in the prior art.

The invention claimed is:

1. A smart card connector assembly, comprising:
    a base element; and
    a contact block assembly pivotably mounted to the base element and pivoting between a first contact block assembly position and a second contact block assembly position, the contact block assembly comprising a smart card contact; and
    wherein:
        the contact block assembly is in the first contact block assembly position when a smart card is not inserted into a smart card receiving slot;
        the contact block assembly is in the second contact block assembly position when a smart card is fully inserted into the smart card receiving slot; and
        the smart card contact is relatively inaccessible to tampering via the smart card receiving slot when the contact block assembly is in the first contact block assembly position.

2. The smart card connector assembly of claim 1, wherein the smart card contact is retracted from the smart card receiving slot when the contact block assembly is in the first contact block assembly position.

3. The smart card connector assembly of claim 1, wherein the smart card contact is in a retracted position when the contact block assembly is in the first contact block assembly position.

4. The smart card connector assembly of claim 1, wherein the smart card contact is positioned to contact a chip on a smart card when the contact block assembly is in the second contact block assembly position.

5. The smart card connector assembly of claim 1, wherein the contact block assembly comprises a plurality of smart card contacts and wherein at least one of the plurality of smart card contacts is relatively inaccessible to tampering via the smart card receiving slot when the contact block assembly is in the first contact block assembly position.

6. The smart card connector assembly of claim 1, further comprising:
    a biasing element biasing the contact block assembly in the first contact block assembly position.

7. The smart card connector assembly of claim 6, wherein the biasing element comprises a leaf spring.

8. The smart card connector assembly of claim 1, further comprising a card full insertion sensor that senses full insertion of the smart card in the smart card receiving slot.

9. The smart card connector assembly of claim 1, further comprising an actuation arm moveable between a first actuation arm position and a second actuation arm position, wherein the actuation arm causes the contact block assembly to pivot to the second contact block assembly position when the actuation arm is in the second actuation arm position.

10. The smart card connector assembly of claim 9, wherein the actuation arm rotates between the first actuation arm position and the second actuation arm position.

11. The smart card connector assembly of claim 9, wherein the actuation arm is in the first actuation arm position when the smart card is not inserted into the smart card receiving slot.

12. The smart card connector assembly of claim 9, wherein the actuation arm is in the second actuation arm position when the smart card is inserted into the smart card receiving slot.

13. The smart card connector assembly of claim 9, wherein the actuation arm exerts pressure on the contact block assembly to cause the smart card contact to enter the smart card receiving slot when the actuation arm is in the second actuation arm position.

14. The smart card connector assembly of claim 13, wherein the pressure is in a direction of the smart card receiving slot.

* * * * *